United States Patent
Ishikawa et al.

(10) Patent No.: US 10,693,890 B2
(45) Date of Patent: Jun. 23, 2020

(54) PACKET RELAY APPARATUS

(71) Applicant: ALAXALA Networks Corporation, Kawasaki-shi, Kanagawa (JP)

(72) Inventors: Yuichi Ishikawa, Kawasaki (JP); Nobuhito Matsuyama, Kawasaki (JP)

(73) Assignee: ALAXALA NETWORKS CORPORATION, Kawasaki (JP)

( * ) Notice: Subject to any disclaimer, the term of this patent is extended or adjusted under 35 U.S.C. 154(b) by 198 days.

(21) Appl. No.: 15/591,189

(22) Filed: May 10, 2017

(65) Prior Publication Data

US 2017/0353478 A1    Dec. 7, 2017

(30) Foreign Application Priority Data

Jun. 2, 2016  (JP) .................................. 2016-111112

(51) Int. Cl.
*H04L 29/06* (2006.01)
*H04L 12/46* (2006.01)
*H04L 12/931* (2013.01)

(52) U.S. Cl.
CPC ...... *H04L 63/1416* (2013.01); *H04L 12/4666* (2013.01); *H04L 49/208* (2013.01); *H04L 63/0236* (2013.01)

(58) Field of Classification Search
CPC ............. H04L 63/1416; H04L 12/4666; H04L 49/208; H04L 63/0236
See application file for complete search history.

(56) References Cited

U.S. PATENT DOCUMENTS

| 7,849,506 B1 * | 12/2010 | Dansey ............... H04L 63/1416 713/188 |
| 9,967,165 B2 * | 5/2018 | Arora .................. H04L 43/0876 |
| 2001/0055274 A1 | 12/2001 | Hegge et al. |

(Continued)

FOREIGN PATENT DOCUMENTS

| JP | 2003-204358 A | 7/2003 |
| JP | 2003-525000 A | 8/2003 |

(Continued)

OTHER PUBLICATIONS

Naoya Ikeda et al., "Large-Scale Edge Router and High-Speed Traffic Monitoring Technologies", IEICE Technical Report, 109 (421) 47-52, Feb. 12, 2010.

(Continued)

*Primary Examiner* — Eleni A Shiferaw
*Assistant Examiner* — Bassam A Noaman
(74) *Attorney, Agent, or Firm* — Mattingly & Malur, PC

(57) ABSTRACT

A packet relay apparatus, which is configured to transmit from a mirror port a mirror packet copied from one of a packet to be received and a packet to be transmitted, the packet relay apparatus comprising: a packet receiving module configured to receive a packet from an input port; a security judgment module configured to judge whether or not the packet is possibly one of an attack and an attack sign; a mirror processing module configured to generate, when it is judged that the packet is possibly one of an attack and an attack sign, a replica of the packet as the mirror packet; and a transmitting module configured to transmit the mirror packet from the mirror port.

18 Claims, 24 Drawing Sheets

(56) References Cited

U.S. PATENT DOCUMENTS

| | | | |
|---|---|---|---|
| 2005/0086522 A1* | 4/2005 | Rowland | H04L 63/1408 726/4 |
| 2006/0198313 A1 | 9/2006 | Kitamura et al. | |
| 2011/0149736 A1* | 6/2011 | Kashyap | H04L 41/0893 370/235 |
| 2012/0216282 A1* | 8/2012 | Pappu | H04L 63/1416 726/23 |
| 2012/0257635 A1* | 10/2012 | Gallatin | H04L 12/4645 370/401 |
| 2014/0283062 A1* | 9/2014 | Kamthe | H04L 63/1425 726/23 |
| 2015/0294111 A1 | 10/2015 | Thapliya | |
| 2016/0191545 A1* | 6/2016 | Nanda | H04L 63/1408 726/1 |

FOREIGN PATENT DOCUMENTS

| | | |
|---|---|---|
| JP | 2005-109715 A | 4/2005 |
| JP | 2005-159551 A | 6/2005 |
| JP | 2006-279930 A | 10/2006 |
| JP | 2009-231890 A | 10/2009 |
| JP | 2015-26182 A | 2/2015 |
| JP | 2015-204478 A | 11/2015 |
| JP | 2016-91402 A | 5/2016 |

OTHER PUBLICATIONS

Monowar H Bhuyan et al. "Surveying Port Scans and Their Detection Methodologies", The Computer Journal, 2011, vol. 54, No. 10.
Japanese Office Action received in corresponding Japanese Application No. 2016-111112 dated Jun. 4, 2019.

\* cited by examiner

PACKET RELAY APPARATUS

CLAIM OF PRIORITY

The present application claims priority from Japanese patent application JP 2016-111112 filed on Jun. 2, 2016, the content of which is hereby incorporated by reference into this application.

BACKGROUND

This invention relates to a packet relay apparatus configured to mirror packets in a network.

There is an increasing security risk from distributed denial of service (DDoS) attacks, advanced persistent threat, and other such attacks. In order to minimize the damage from an attack, it is necessary to monitor attack packets that cause the attack on a network positioned upstream of an attack target, and protect the attack target from the attack when an attack is detected.

In order to analyze signs of a large-scale attack and prepare a countermeasure, it is necessary to monitor and analyze attack sign packets on the network that show a sign of an attack. Therefore, traffic data is collected by the packet relay apparatus, for example, a router or a switch constructing the network by using a mirror function of the packet relay apparatus to transmit the packets in the packet relay apparatus to an analyzer that has an attack analysis function.

When the occurrence of an attack or an attack sign is detected as a result of the analysis of the collected traffic data by the analyzer, a countermeasure for protecting against the attack is implemented based on the analysis result. As described later, there are various different types of attacks that utilize networks, including logic attacks that exploit a vulnerability of a system, attacks that spoof the transmission source, flood attacks in which a large amount of packets are transmitted to consume network bandwidth resources and server processing resources, for example, and attack signs trying to gain entry into a target.

The information required for analysis, the analysis method, the difficulty of analysis, and other such matters are different for each attack type, and hence various analyzers are provided in accordance with the attack type, for example, a firewall (FW), an intrusion detection system (IDS), an intrusion protection system (IPS), a web application firewall (WAF), a DDoS attack countermeasure apparatus, and a forensic server.

When performing attack analysis, the analysis performance of the analyzers are a constraint, and the packet relay apparatus cannot analyze all of the traffic to be relayed. As a result, in "Large-Scale Edge Router and High-Speed Traffic Monitoring Technologies", The Institute of Electronics, Information and Communication Engineers Technical Report, IA, Internet Architecture 109 (421) 47-52, 2010-02-12, there is disclosed a technology in which a condition for identifying the traffic to be analyzed in detail is set in a switch, and only specific traffic is transferred to an IDS, which is a type of analyzer.

SUMMARY

In order to analyze various different attack types, it is necessary to couple a plurality of different analyzers that handle different attack types to the packet relay apparatus, refine the attack types to a certain extent based on primary screening by the packet relay apparatus, and divide packets after the screening among the analyzers based on the attack type to be handled by each analyzer. The analysis method is different for each attack type, and hence the screening method is also different for each attack type.

In the technology disclosed in "Large-Scale Edge Router and High-Speed Traffic Monitoring Technologies", The Institute of Electronics, Information and Communication Engineers Technical Report, IA, Internet Architecture 109 (421) 47-52, 2010-02-12, there is only disclosed a method in which the traffic is refined by a single type of screening method, which is referred to as aggregated flow mining (AFM), and transferred to a single type of analyzer, which is referred to as IDS. In M. H. Bhuyan, D. K. Bhattacharyya and J. K. Kalita, "Surveying Port Scans and Their Detection Methodologies", The Computer Journal, 2011, VOL. 54, NO. 10, pp. 1565-1581, there is disclosed a technology relating to detection of a port scan.

In the related art described above, there is a problem in that the threats included in the packets cannot be refined into a plurality of attack types and transferred to an analyzer suited to the attack type. In other words, in the related art described above, all the packets are input to the analyzers, and hence the load on the analyzers in order to handle the plurality of attack types may be excessive.

A representative aspect of the present disclosure is as follows. A packet relay apparatus, which is configured to transmit from a mirror port a mirror packet copied from one of a packet to be received and a packet to be transmitted, the packet relay apparatus comprising: a packet receiving module configured to receive a packet from an input port; a security judgment module configured to judge whether or not the packet is possibly one of an attack and an attack sign; a mirror processing module configured to generate, when it is judged that the packet is possibly one of an attack and an attack sign, a replica of the packet as the mirror packet; and a transmitting module configured to transmit the mirror packet from the mirror port.

According to this invention, the packet relay apparatus is capable of outputting only the packets judged as possibly being an attack or an attack sign, and therefore the load on the apparatus (e.g., analyzer) coupled to a mirror port can be reduced.

DETAILED DESCRIPTION OF THE PREFERRED EMBODIMENTS

Embodiments of this invention are described below with reference to the accompanying drawings.

First Embodiment

Figure 1:
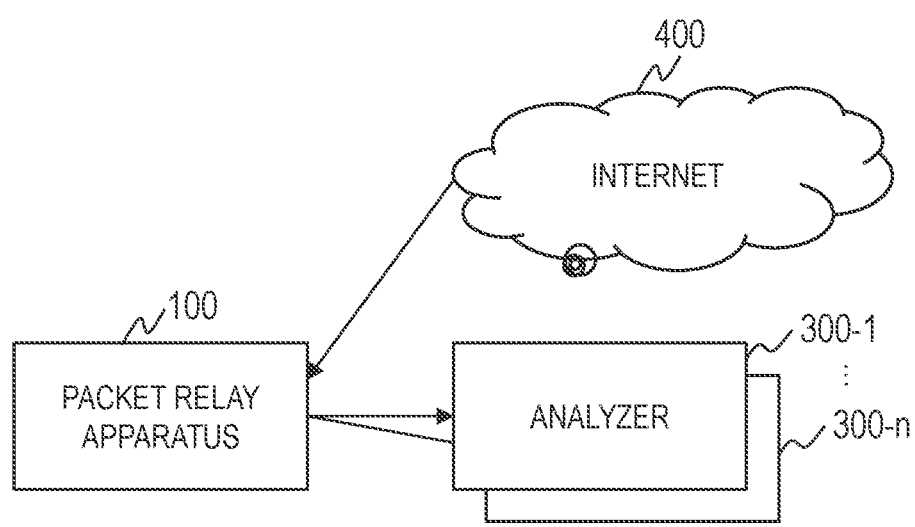
FIG. 1 is a block diagram for illustrating an embodiment of this invention, in which a network uses a relay apparatus.

FIG. 1 is a block diagram for illustrating a first embodiment of this invention, in which a network uses a relay apparatus.

FIG. 1 is a block diagram of a network in which receiving packets received via an Internet 400 or transmitting packets to be transmitted to the Internet 400 are mirrored in analyzers 300-1 to 300-n by a packet relay apparatus 100 according to this invention.

Each of the analyzers 300-1 to 300-n is a security apparatus, for example, a FW, an IDS, an IPS, a WAF, a DDoS attack countermeasure apparatus or a forensic server. In the following description, the reference numeral 300 without a suffix after the "-" is used to collectively refer to all of the analyzers 300-1 to 300-n. The same also applies for other components. Further, the receiving packets and the transmitting packets are collectively referred to as "packets".

Figure 2:
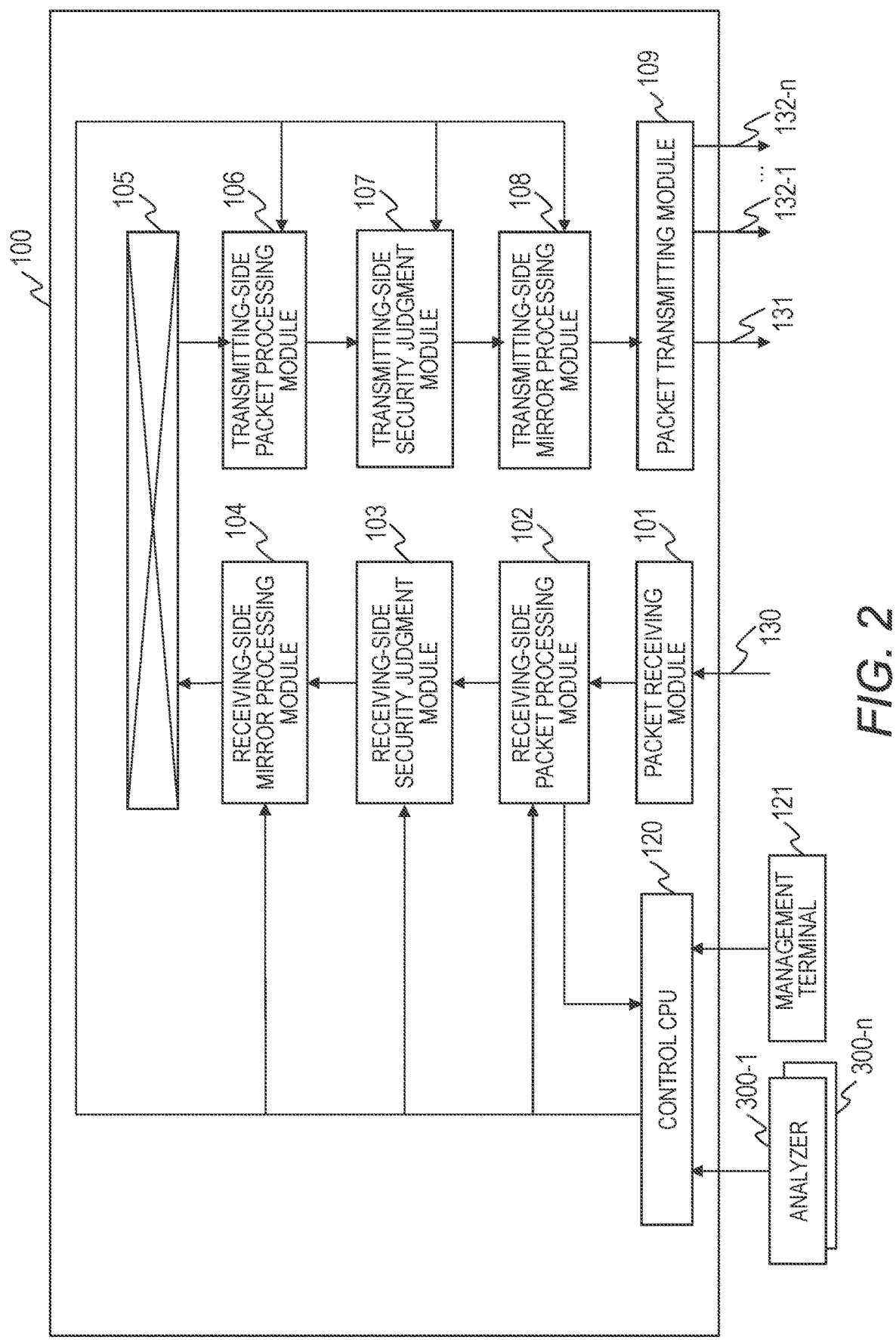
FIG. 2 is a block diagram of the packet relay apparatus according to the first embodiment of this invention.

FIG. 2 is a block diagram of the packet relay apparatus 100 according to this invention. The packet relay apparatus 100 according to this invention is constructed from an input port 130, a packet receiving module 101, a receiving-side packet processing module 102, a receiving-side security judgment module 103, a receiving-side mirror processing module 104, a packet relay processing module 105, a transmitting-side packet processing module 106, a transmitting-side security judgment module 107, a transmitting-side mirror processing module 108, a packet transmitting module 109, an output port 131, mirror ports 132-1 to 132-n, a control CPU 120, and a management terminal 121. The input port 130 is coupled to an input line. The packet receiving module 101 is configured to receive packets. The receiving-side packet processing module 102 is configured to perform judgment processing relating to a basic packet relay, including a judgment of an output port from which a receiving packet is to be output and a judgment of a priority of the receiving packet, and to transfer to the control CPU 120 a packet relating to a setting instruction transmitted from the analyzer 300 addressed to the packet relay apparatus 100. The receiving-side security judgment module 103 is configured to perform a judgment relating to an attack or an attack sign by the receiving packet. The receiving-side mirror processing module 104 is configured to perform a judgment relating to mirroring of the receiving packet and to perform copy processing for generating a receiving mirror packet. The packet relay processing module 105 is configured to relay the receiving packet to the transmitting side based on the output port judged by the receiving side. The transmitting-side packet processing module 106 is configured to perform judgment processing relating to a basic packet relay, including a judgment of a priority of a transmitting packet on the transmitting side. The transmitting-side security judgment module 107 is configured to perform a judgment relating to an attack or an attack sign by the transmitting packet. The transmitting-side mirror processing module 108 is configured to perform a judgment relating to mirroring of the transmitting packet and to perform copy processing for generating a transmitting mirror packet. The packet transmitting module 109 is configured to transmit the transmitting packet. The output port 131 is coupled to an output line. The mirror ports 132-1 to 132-n are each coupled to a mirror line. The control CPU 120 is configured to perform a setting instruction in various tables included in the packet relay apparatus 100 based on an instruction from the management terminal 121 or an instruction in a packet relating to the setting instruction transmitted from the analyzer 300 and addressed to the packet relay apparatus 100. The management terminal 121 is configured to receive input of a setting for the packet relay apparatus 100 by an administrator of the packet relay apparatus 100.

This invention includes, as characteristic configurations thereof, the following configurations: a configuration in which a judgment relating to receiving mirroring is performed by the receiving-side mirror processing module 104 based on a judgment result by the receiving-side security judgment module 103, and a receiving mirror packet is generated based on that judgment; a configuration in which a judgment relating to transmitting mirroring is performed by the transmitting-side mirror processing module 108 based on a judgment result by the transmitting-side security judgment module 107, and a transmitting mirror packet is generated based on that judgment; a configuration in which information on the judgment result by the receiving-side security judgment module 103 is added to the receiving mirror packet, and the receiving mirror packet is mirrored; and a configuration in which information on the judgment result by the transmitting-side security judgment module 107 is added to the transmitting mirror packet, and the transmitting mirror packet is mirrored.

Each analyzer 300, which is configured to operate in cooperation with the function for adding and mirroring the information on the judgment result of the packet relay apparatus 100 according to this invention, includes operation modes corresponding to whether or not the packet relay apparatus 100 according to this invention has added the information on the judgment result to the mirror packet transmitted by the packet relay apparatus 100 according to this invention.

In an operation mode of the analyzer 300 corresponding to a case where the information on the judgment result of the packet relay apparatus 100 is not added, the analyzer 300 analyzes the mirror packet as an ordinary analyzer 300. On the other hand, in an operation mode of the analyzer 300 corresponding to a case where the information on the judgment result of the packet relay apparatus 100 is added, the position in which the information on the judgment result is included and the meaning of the information can be set by the administrator of the analyzer 300, and when the mirror packet is received by the analyzer 300, the analyzer 300 extracts the information on the judgment result from the mirror packet, and after the extraction, analyzes the mirror packet as an ordinary analyzer 300.

The analysis load on the analyzer 300 may be reduced by skipping judgment processing that can be performed based on the information on the judgment result extracted during the analysis by the analyzer 300. For example, when it is judged that a packet received by the packet relay apparatus 100 is a flood attack, and that judgment result is added to the mirror packet, the analyzer 300 may skip the processing for judging whether or not that packet is a flood attack, and start the processing for analyzing the packets forming the flood attack.

The analyzer 300, the management terminal 121, and the control CPU 120 may also be coupled via a management network, which is not shown.

Figure 3:
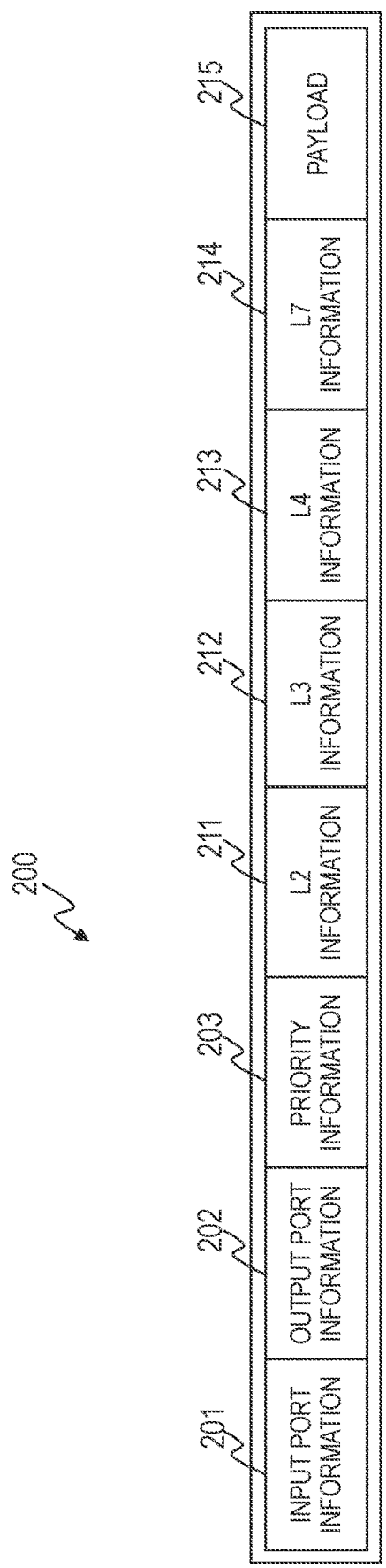
FIG. 3 is a diagram for illustrating an example of packet information output by the receiving-side packet processing module according to the first embodiment of this invention.

FIG. 3 is a diagram for illustrating an example of packet information 200 outputs by the receiving-side packet processing module 102.

In the packet information 200 illustrated in FIG. 3, input port information 201 is added by the packet receiving module 101 to L2 (Layer 2) information 211, L3 (Layer 3) information 212, L4 (Layer 4) information 213, L7 (Layer 7) information 214, and a payload 215 of the receiving packet, and output port information 202 and priority information 203 that are judged by the receiving-side packet processing module 102 are also added. The packet information 200 is output from the receiving-side packet processing module 102 to the receiving-side security judgment module 103.

Figure 4:
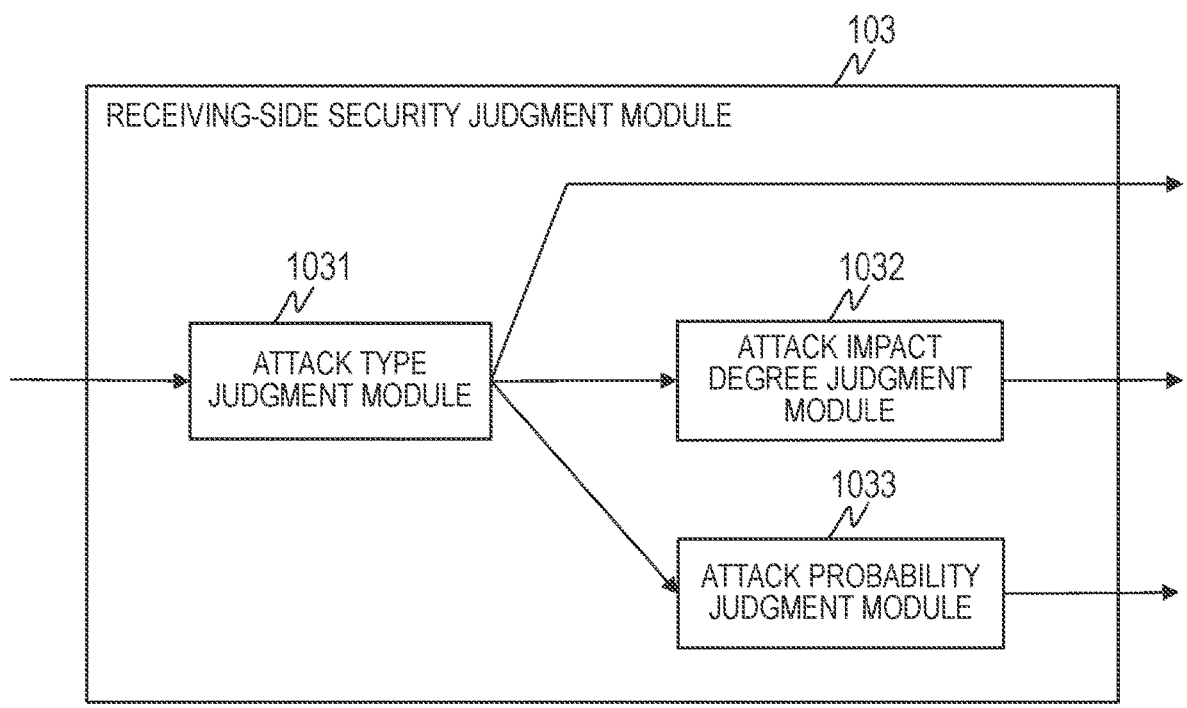
FIG. 4 is a block diagram for illustrating an example of the configuration of the receiving-side security judgment module according to the first embodiment of this invention.

FIG. 4 is a block diagram for illustrating an example of the configuration of the receiving-side security judgment module 103. The receiving-side security judgment module 103 is constructed from an attack type judgment module 1031 configured to judge an attack type or an attack sign type, an attack impact degree judgment module 1032 configured to judge an impact degree of an attack based on the judgment result of the attack type or the attack sign type, and an attack probability judgment module 1033 configured to judge an attack probability based on the judgment result of the attack type or the attack sign type.

The transmitting-side security judgment module 107 has a configuration similar to that of the receiving-side security judgment module 103 (however, because the transmitting-side security judgment module 107 does not include a routing table 1020, which is described later, the transmitting-side security judgment module 107 does not perform the processing relating to "(3) Transmission Source Spoofing Attack" described later).

Figure 5:
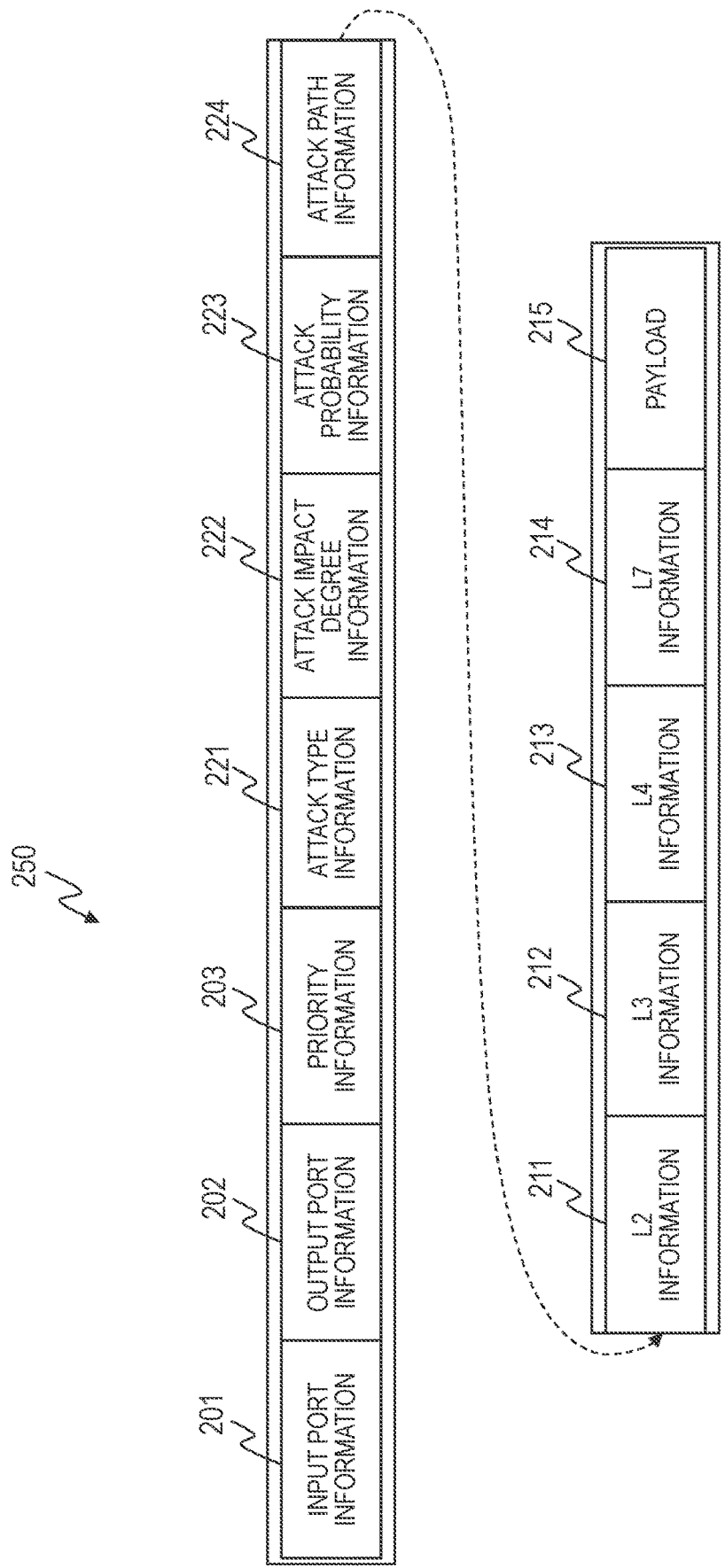
FIG. 5 is a diagram for illustrating an example of packet information to be output by the receiving-side security judgment module according to the first embodiment of this invention.

FIG. 5 is a diagram for illustrating an example of packet information 250 to be output by the receiving-side security judgment module 103. The receiving-side security judgment module 103 is configured to output to the receiving-side mirror processing module 104 the packet information 250 illustrated in FIG. 5, which is obtained by adding attack type information 221, attack impact degree information 222, attack probability information 223, and attack path information 224 judged by the receiving-side security judgment module 103 to the packet information 200 input from the receiving-side packet processing module 102. The transmitting-side security judgment module 107 is also configured to perform the same processing as that of the receiving-side security judgment module 103.

Figure 6:
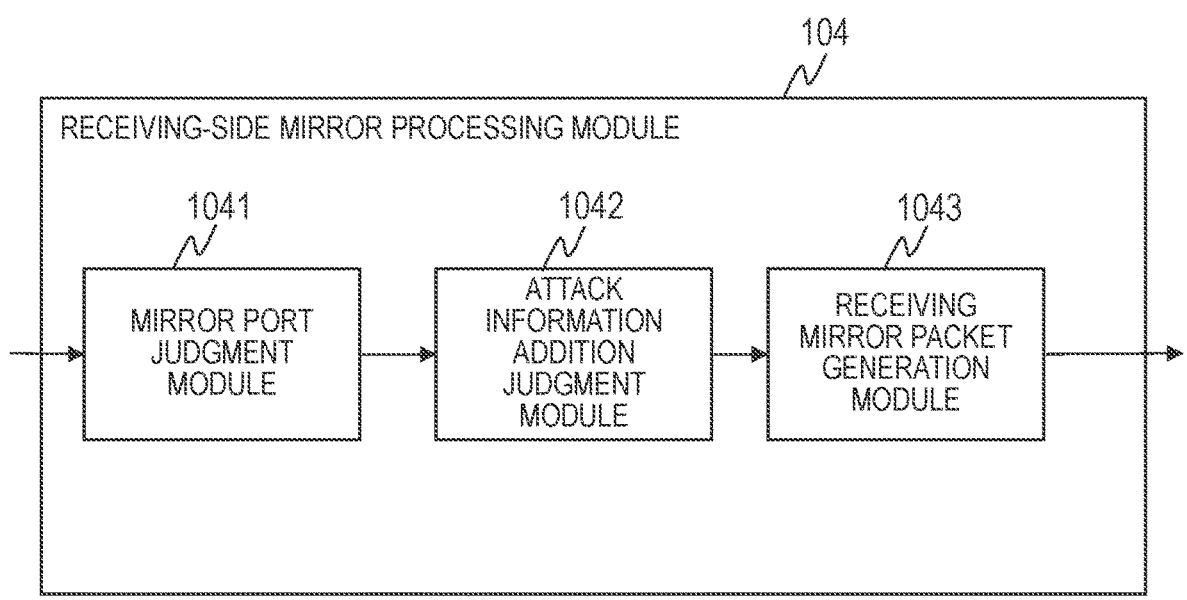
FIG. 6 is a block diagram for illustrating an example of the configuration of the receiving-side mirror processing module according to the first embodiment of this invention.

FIG. 6 is a block diagram for illustrating an example of the configuration of the receiving-side mirror processing module 104. The receiving-side mirror processing module 104 is constructed from a mirror port judgment module 1041, an attack information addition judgment module 1042, and a receiving mirror packet generation module 1043. The mirror port judgment module 1041 is configured to judge, based on the attack type information 221, the attack impact degree information 222, the attack probability information 223, and the attack path information 224, whether or not a receiving mirror packet can be generated, a mirror port 132 for transmitting the mirror packet when a mirror packet is generated, and a mirror priority, which is the priority for transmitting the mirror packet at the mirror port 132. The attack information addition judgment module 1042 is configured to judge whether or not the attack type information 221, the attack impact degree information 222, the attack probability information 223, and the attack path information 224 are added to the mirror packet at the mirror port 132. The receiving mirror packet generation module 1043 is configured to generate the receiving mirror packet. The transmitting-side mirror processing module 108 has the same configuration as that of the receiving-side mirror processing module 104.

When it is judged by the mirror port judgment module 1041 that a mirror packet is to be generated for the packet information 250 input from the receiving-side security judgment module 103, the receiving-side mirror processing module 104 generates an apparatus-internal reception mirror packet formed of packet information 260 illustrated in FIG.

7, and outputs the packet to the packet relay processing module 105. In the packet information 260, a mirror flag 231 is set to a value indicating "valid". The packet information 260 also includes mirror port information 232 judged based on the attack type information 221, the attack impact degree information 222, the attack probability information 223, and the attack path information 224 by the mirror port judgment module 1041, mirror priority information 233, and an attack information addition flag 234 judged by the attack information addition judgment module 1042.

The mirror port information 232 is information for setting which mirror port 132 to output to among the plurality of mirror ports 132-1 to 132-n. The mirror port information 232 may be set by the mirror port judgment module 1041 in accordance with the type of the analyzer 300 coupled to the mirror port 132 and the attack type information 221. As a result, the receiving-side mirror processing module 104 may hold a table (not shown) in which the type of each analyzer 300 coupled to the mirror ports 132-1 to 132-n is stored in advance. Alternatively, the mirror port judgment module 1041 may determine the mirror port 132-1 to 132-n to be output to in accordance with the attack type information 221.

The attack information addition judgment module 1042 sets the attack information addition flag 234 to "valid" when it is judged that the attack type information 221, the attack impact degree information 222, the attack probability information 223, and the attack path information 224 are to be added to the mirror port 132 determined by the mirror port judgment module 1041, and sets the attack information addition flag 234 to "invalid" when those pieces of information are not to be added.

Figure 20:
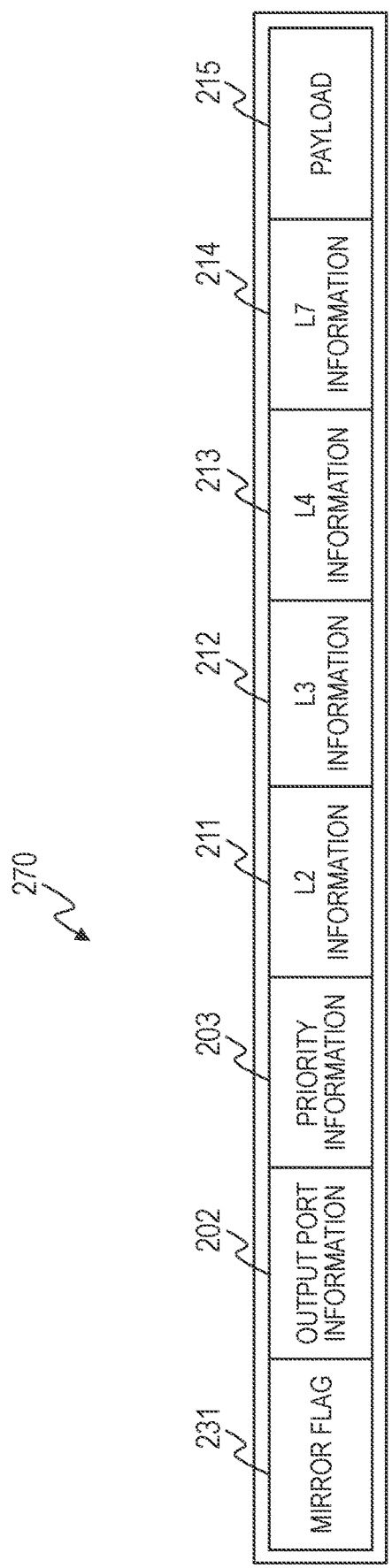
FIG. 20 is a diagram for illustrating an example of packet information according to the first embodiment of this invention.

When it is judged that a mirror packet is not to be generated by the mirror port judgment module 1041 from the original receiving packet, which is the copy source of the mirror packet, the mirror flag 231 is set to a value indicating "invalid", and packet information 270 illustrated in FIG. 20 is output to the packet relay processing module 105.

The processing that is performed when it is judged that a mirror packet is not to be generated by the mirror port judgment module 1041 from the original receiving packet, which is the copy source of the mirror packet, is described later in the description regarding the receiving mirror packet generation module 1043.

The transmitting-side mirror processing module 108 also performs the same processing as the receiving-side mirror processing module 104.

When the mirror flag 231 of the packet information 260 on the mirror packet, or the mirror flag 231 of the packet information 270 that is not a mirror packet, which is input from the packet relay processing module 105 to the transmitting-side packet processing module 106, the transmitting-side security judgment module 107, and the transmitting-side mirror processing module 108, is a value indicating "valid", it is judged that the packet information 260 is a receiving mirror packet, and processing is not to be performed by the transmitting-side packet processing module 106, the transmitting-side security judgment module 107, and the transmitting-side mirror processing module 108, and the packet information 260 input from the packet relay processing module 105 is to be output as it is to the packet transmitting module 109.

When the mirror flag 231 of the packet information 260 on the mirror packet, or the mirror flag 231 of the packet information 270 that is not a mirror packet, which is input from the packet relay processing module 105 to the transmitting-side packet processing module 106, the transmitting-side security judgment module 107, and the transmitting-side mirror processing module 108, is a value indicating "invalid", the packet information 270 is not a receiving mirror packet, but a relay packet. As a result, the same processing as the receiving-side packet processing module 102, the receiving-side security judgment module 103, and the receiving-side mirror processing module 104 is performed by the transmitting-side packet processing module 106, the transmitting-side security judgment module 107, and the transmitting-side mirror processing module 108, and the packet is output to the packet transmitting module 109.

Figure 8:
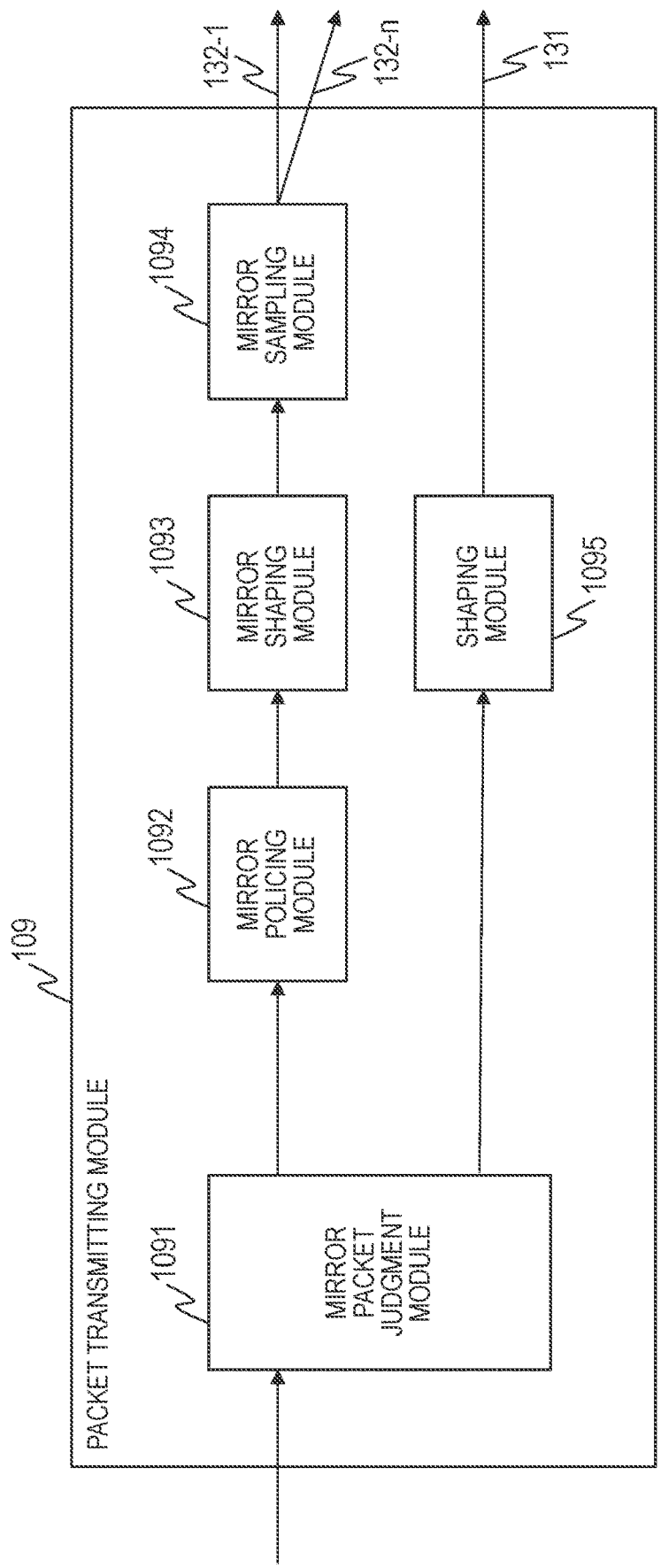
FIG. 8 is a block diagram for illustrating an example of the configuration of the packet transmitting module according to the first embodiment of this invention.

FIG. 8 is a block diagram for illustrating an example of the configuration of the packet transmitting module 109. The packet transmitting module 109 is constructed from a mirror packet judgment module 1091, a mirror policing module 1092, a mirror shaping module 1093, a mirror sampling module 1094, the mirror ports 132-1 to 132-n, a shaping module 1095, and the output port 131. The mirror packet judgment module 1091 is configured to judge whether or not the packet is a mirror packet based on the mirror flag 231 of the packet information 260 or the packet information 270. The mirror policing module 1092 is configured to police mirror packets. The mirror shaping module 1093 is configured to shape mirror packets. The mirror sampling module 1094 is configured to sample mirror packets. The mirror ports 132-1 to 132-n are configured to transmit the mirror packet. The shaping module 1095 is configured to shape relay packets that are not mirror packets. The output port 131 is configured to transmit relay packets.

When the mirror flag 231 of the packet information 260 or the packet information 270 input to the packet transmitting module 109 is set to a value indicating "valid", the packet information 260 is judged to be a mirror packet by the mirror packet judgment module 1091, and the packet is subjected to policing by the mirror policing module 1092, shaping by the mirror shaping module 1093, and sampling by the mirror sampling module 1094 based on the mirror port information 232, the mirror priority information 233, the attack information addition flag 234, the attack type information 221, the attack impact degree information 222, the attack probability information 223, and the attack path information 224. The resultant packet information is then output from the mirror port 132 to the mirror line.

When the mirror flag 231 of the packet information 260 or the packet information 270 input to the packet transmitting module 109 is set to a value indicating "invalid", the packet information 270 is judged to be a relay packet by the mirror packet judgment module 1091, and the packet is subjected to shaping by the shaping module 1095. The resultant packet information is then output from the output port 131 to the output line.

Next, the configuration and the processing of each processing module are described in detail.

Examples of the attack type and the attack sign type judged by the attack type judgment module 1031 of the receiving-side security judgment module 103 or the transmitting-side security judgment module 107 include the following.

(1) Logic attack: A packet is judged to be a logic attack when the packet matches a logic attack list in which conditions (including a condition relating to byte length) for judging an attack exploiting a vulnerability of a computer system are registered.

(2) Filter packet: A packet is judged to be a filter packet (user registration attack) when the packet matches a filter list (access control list (ACL)) in which conditions for a flow (i.e. group of packets determined by a condition relating to the packet information 200) to be discarded, which are defined by an instruction in a packet relating to a setting instruction transmitted from the administrator of the packet relay apparatus 100 or an analyzer and addressed to the packet relay apparatus 100, are registered.

(3) Transmission source spoofing attack: A packet is judged to be a transmission source spoofing attack when information on the transmission source address of the packet is judged to be a spoof by unicast Reverse Path Forwarding (uRPF) or other such means. A transmission source spoofing attack may be thought of as being a sign of a large-scale DDoS attack.

(4) Flood attack: A flood attack is judged when a flow bandwidth exceeds a monitoring bandwidth (or bandwidth threshold) defined by an instruction in a packet relating to a setting instruction transmitted from the administrator of the packet relay apparatus 100 or an analyzer and addressed to the packet relay apparatus 100. The monitoring bandwidth may be used for judging a severity level of the impact degree of the flood attack by providing a low-level monitoring bandwidth and a high-level monitoring bandwidth.

(5) Attack sign: An attack sign is judged when a statistical value of the flow or a temporal fluctuation in bandwidth is much different from normal. Continuous access to a specific destination port including a plurality of destination Internet protocol (IP) addresses is referred to as a host scan, and continuous access to a plurality of destination ports including a specific destination IP address is referred to as a port scan. Those scans are known to be attack signs for attempting to gain entry into a target. The techniques disclosed in M. H. Bhuyan, D. K. Bhattacharyya and J. K. Kalita, "Surveying Port Scans and Their Detection Methodologies", The Computer Journal, 2011, VOL. 54, NO. 10, pp. 1565-1581 may be employed to detect the host scan or the port scan.

A statistical value of a normal flow is accumulated by a statistics function (not shown) of the packet relay apparatus 100. As the statistical value, for example, an average value of the destination IP addresses, transmission source IP addresses, port numbers, and bandwidth for each time band are calculated and accumulated. The packet relay apparatus 100 can judge that the average value is different from normal when the current statistical value and the statistical value for the same time band in the past exhibit a difference that exceeds a predetermined threshold.

The statistics function of the packet relay apparatus 100 can accumulate a feature amount or a feature pattern of the flow or the packets. For example, as the feature amount, the statistics function can use a byte length of the packets, the bandwidth of the packets (or the flow), and a statistic. As the feature pattern, the statistics function can use information on the destination IP addresses and the port numbers of the packets, or a number of accesses in each time band.

Figure 9:
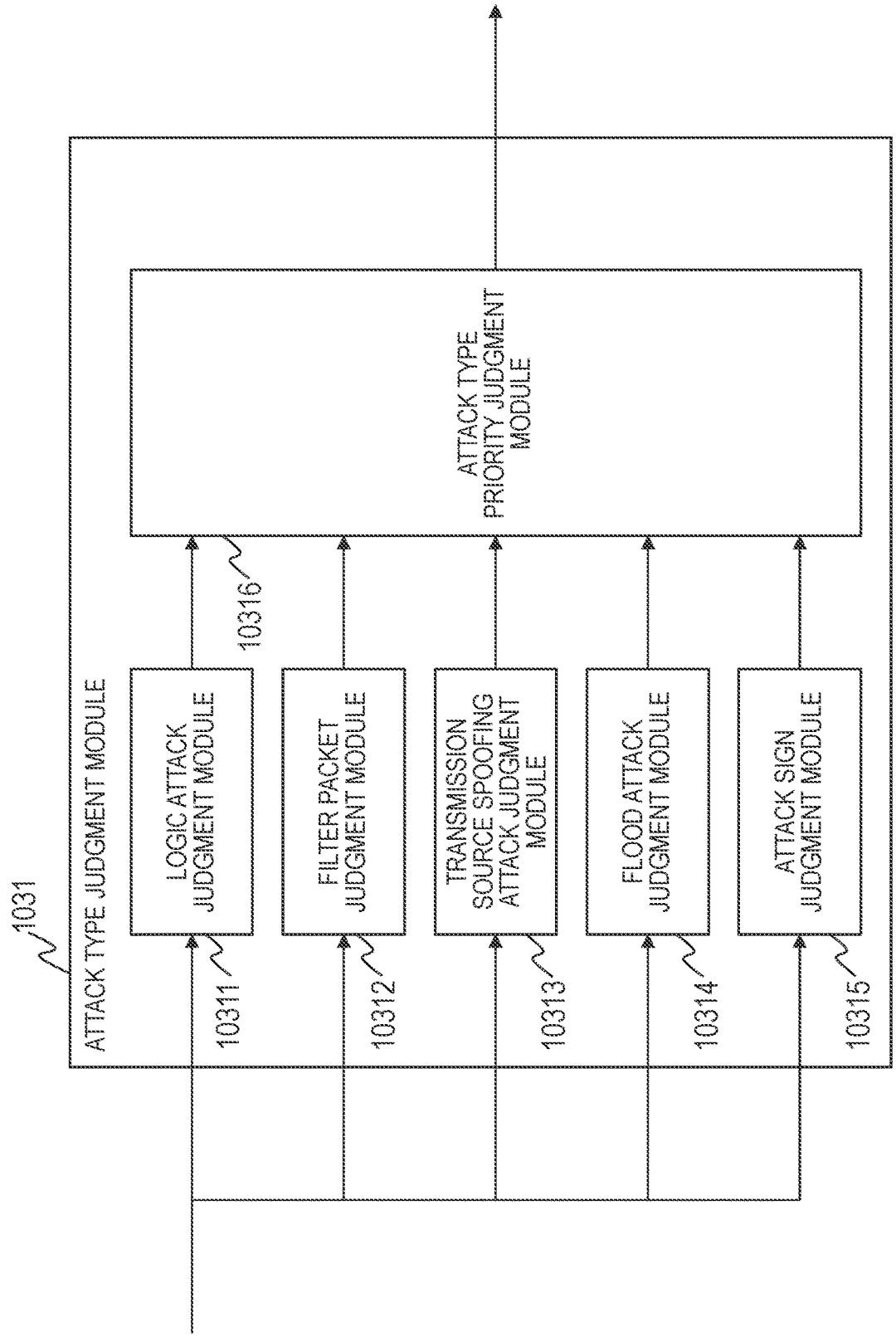
FIG. 9 is a block diagram for illustrating an example of the configuration of the attack type judgment module according to the first embodiment of this invention.

FIG. 9 is a block diagram for illustrating an example of the configuration of the attack type judgment module 1031.

The attack type judgment module 1031 is constructed from a logic attack judgment module 10311, a filter packet judgment module 10312, a transmission source spoofing attack judgment module 10313, a flood attack judgment module 10314, an attack sign judgment module 10315, and an attack type priority judgment module 10316. The logic attack judgment module 10311 is configured to judge whether or not the packet is a logic attack. The filter packet judgment module 10312 is configured to judge whether or not the packet matches a filter list. The transmission source spoofing attack judgment module 10313 is configured to judge whether or not the source transmission address of the packet is spoofed. The flood attack judgment module 10314 is configured to judge whether or not the flow bandwidth or a burst amount (i.e., data amount of burst traffic) exceeds a certain value. The attack sign judgment module 10315 is configured to judge whether or not the packet is an attack sign based on an access feature of the packet, the statistical value, and temporal fluctuation in bandwidth. The attack type priority judgment module 10316 is configured to judge, when the packet matches the plurality of attack types or attack sign types (1) to (5) exemplified above, the attack type or the attack sign type of the packet based on the priority of each attack type and attack sign type.

In the first embodiment, a logic attack has the highest priority, followed by, in order, a filter packet, a transmission source spoofing attack, a flood attack, and an attack sign. It is desired that this priority be set in order of decreasing impact degree and probability of the attack. When the packet information 200 is input to the attack type judgment module 1031, the packet information 200 is input to each of the logic attack judgment module 10311, the filter packet judgment module 10312, the transmission source spoofing attack judgment module 10313, the flood attack judgment module 10314, and the attack sign judgment module 10315.

When the judgment relating to the attack type by each of the judgment modules 10311 to 10315 of FIG. 9 has been performed, a judgment result is input to the attack type priority judgment module 10316. The attack type priority judgment module 10316 judges the attack type based on the priority of each attack type, and outputs the judgment result as the attack type information 221 in the packet information 250. For example, when it is judged that the packet information 200 matches both a logic attack and a flood attack, the attack type of the packet is judged as being a logic attack.

Figure 10:
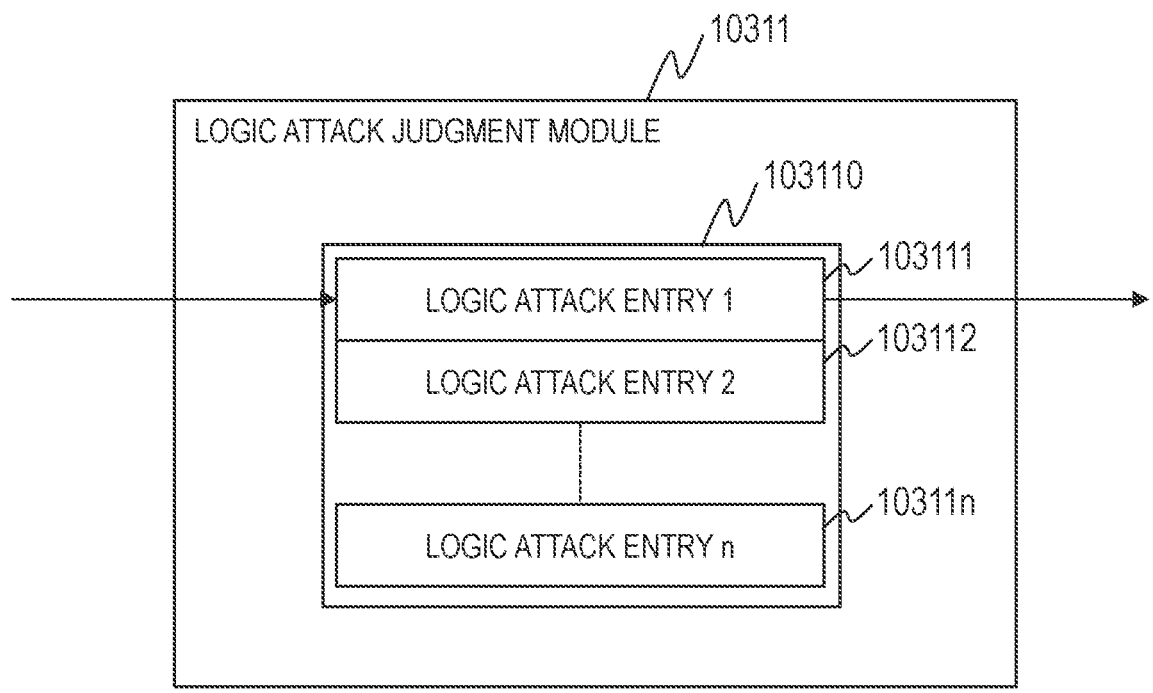
FIG. 10 is a block diagram for illustrating an example of the configuration of the logic attack judgment module according to the first embodiment of this invention.

FIG. 10 is a block diagram for illustrating an example of the configuration of the logic attack judgment module 10311. The logic attack judgment module 10311 includes a logic attack table 103110 constructed from logic attack entries 1 (103111) to n (10311*n*), in which a condition for judging that the attack type is a logic attack is set.

When the packet information 200 is input, the logic attack judgment module 10311 sequentially performs comparison for determining whether or not predetermined information among the packet information 200 matches the conditions of the logic attack entries 1 (103111) to n (10311*n*). The logic attack judgment module 10311 judges that the attack type of the packet information 200 is a logic attack when there is a matching entry.

The logic attack entry condition not only includes a comparison based on a condition value but also a logical judgment based on a comparison expression or an expression with an equals sign. For example, when a land attack is set as the logic attack, the condition is set based on the following expression with an equals sign: "transmission source IP address=destination IP address of the L3 information 212". When a ping of death attack is set as the logic attack, the condition is set based on a comparison expression in which the sum of the fragment offset of the L3 information 212 and the byte length of the payload 215 is greater than a certain value.

Another example is setting, when an invalid transmission control protocol (TCP) flags attack is set as the logic attack, an impossible combination of TCP flags in the logic attack table 103110 as the logic attack entry condition. The attack type of the packet information 200 when the logic attack entry matched by the packet information 200 is a land attack setting is "logic attack (land attack)". The attack type of the packet information 200 when the logic attack entry matched by the packet information 200 is a ping of death attack setting is "logic attack (ping of death attack)". The attack type of the packet information 200 when the logic attack entry matched by the packet information 200 is an invalid TCP flags attack setting is "logic attack (invalid TCP flags attack)".

In this manner, a logic attack packet can be identified by registering a feature amount (e.g., byte length) or a feature pattern of the packet in the attack entry, and comparing the feature amount or the feature pattern with the packet information 200.

Figure 11:
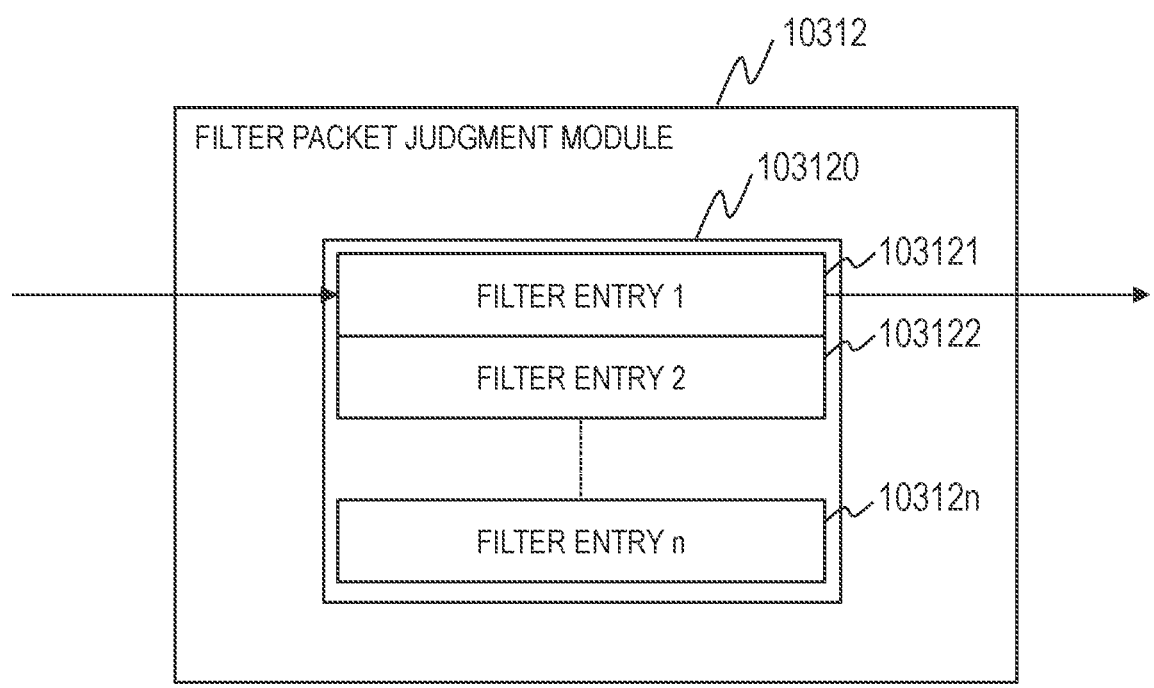
FIG. 11 is a block diagram for illustrating an example of the configuration of the filter packet judgment module according to the first embodiment of this invention.

FIG. 11 is a block diagram for illustrating an example of the configuration of the filter packet judgment module 10312. The filter packet judgment module 10312 includes a filter table (search table) 103120 constructed from filter entries 1 (103121) to n (10312*n*), in which a condition for judging that the attack type is a filter packet is set.

When the packet information 200 is input, the filter packet judgment module 10312 sequentially compares a condition required for judgment of a matching comparison with a filter entry among the packet information 200 with the conditions of the filter entries 1 (103121) to n (10312*n*). When there is a matching filter entry, the filter packet judgment module 10312 judges that the attack type of the packet information 200 is a filter packet condition. The attack type when the matched filter entry is a filter entry n (10312*n*) is "filter packet (filter entry n)". The filter entry condition is set in the filter table 103120 by the control CPU 120 based on an instruction in a packet relating to a setting instruction addressed to the packet relay apparatus 100 and issued by the packet relay apparatus 100 via the management terminal 121 or by the analyzer 300 based on the conditions in the L2 information 211, the L3 information 212, the L4 information 213, and the L7 information 214.

In this manner, the filter packet judgment module 10312 is capable of identifying the attack packet from the feature pattern in the filter table (search table) 103120.

Figure 12:
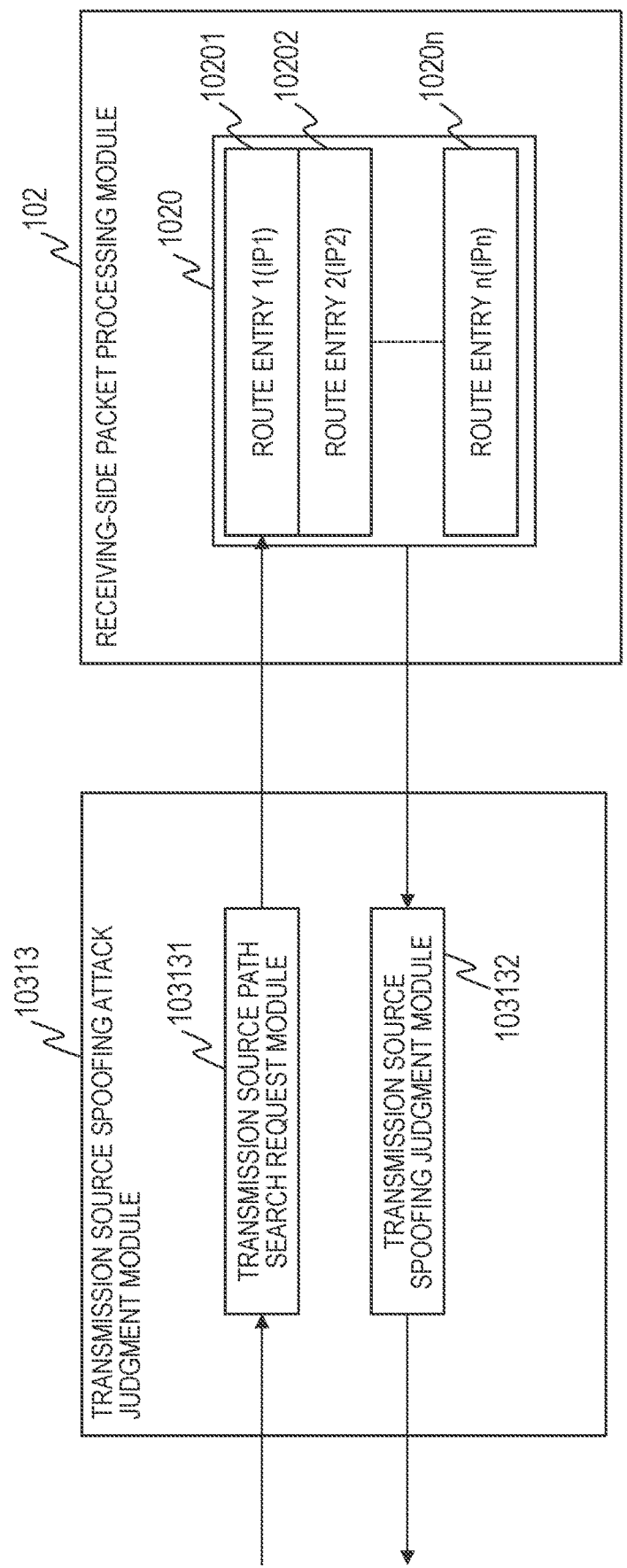
FIG. 12 is a block diagram for illustrating an example of the configuration of the transmission source spoofing attack judgment module and an example of the configuration of the receiving-side packet processing module according to the first embodiment of this invention.

FIG. 12 is a block diagram for illustrating an example of the configuration of the transmission source spoofing attack judgment module 10313 and an example of the configuration of the receiving-side packet processing module 102. The transmission source spoofing attack judgment module 10313 is constructed from a transmission source path search request module 103131 and a transmission source spoofing judgment module 103132. The receiving-side packet processing module 102 is constructed from a routing table 1020 including a route entry 1 (IP1) 10201, in which an output line for an IP address 1 is set, to a route entry n (IPn) 1020*n*, in which an output port for a route entry n (IP address n) is set.

The receiving-side packet processing module 102 refers to the route entry (routing table 1020) corresponding to the destination IP address of the L3 information 212 in the packet information 200, and obtains information on the output port 131 for that destination IP address. When the packet information 200 is input to the transmission source spoofing attack judgment module 10313, the input port information 201 in the packet information 200 and the transmission source IP address of the L3 information 212 are extracted by the transmission source path search request module 103131, and are output to the receiving-side packet processing module 102.

When the transmission source IP address is input to the receiving-side packet processing module 102, the receiving-side packet processing module 102 refers to the route entry n (IPn) for that transmission source IP address, and obtains information on the output port 131 for that transmission source IP address. The input port information 201 in the packet information 200 and the output port information 202 obtained by referring to the routing table 1020 based on the transmission source IP address are input to the transmission source spoofing attack judgment module 10313, and the input port information 201 and the output port information 202 are matched and compared by the transmission source spoofing judgment module 10312. When the input port information 201 and the output port information 202 do not match, the attack type of the packet information 200 is judged to be a transmission source spoofing attack (transmission source IP address value).

In this manner, the transmission source spoofing attack judgment module 10313 is capable of identifying a transmission source spoofing attack packet based on the feature pattern of the transmission source IP address.

Figure 13:
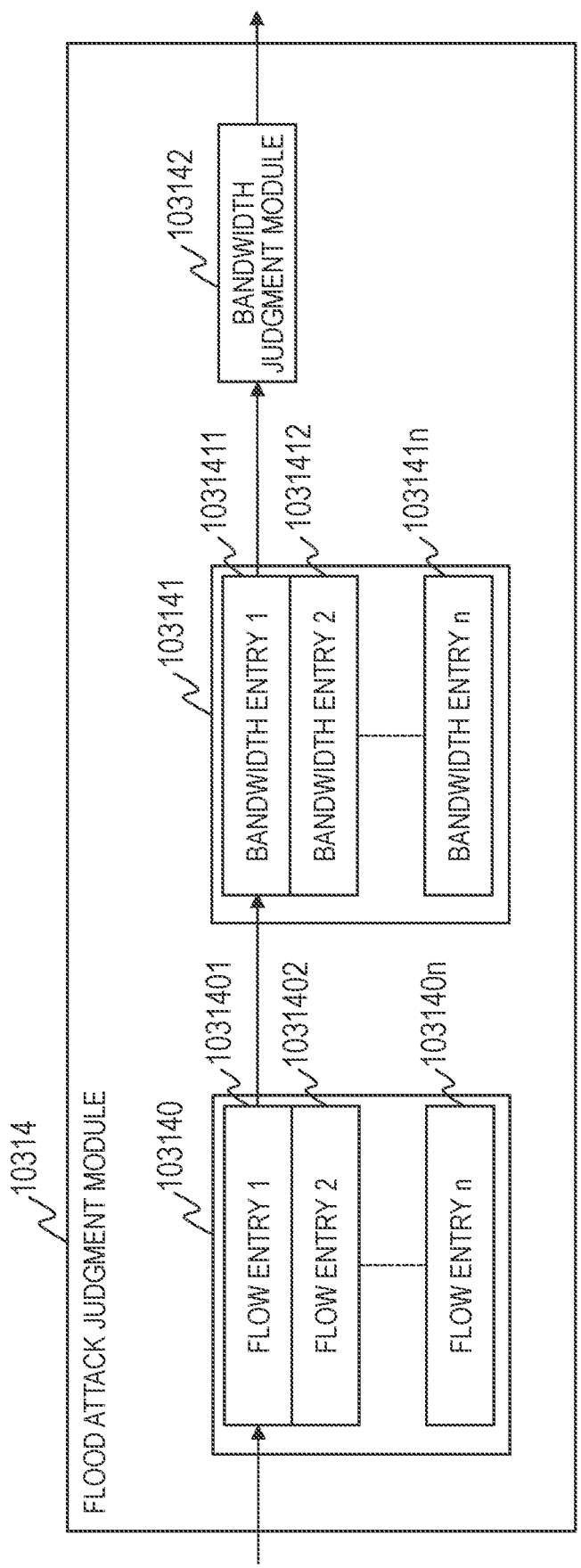
FIG. 13 is a block diagram for illustrating an example of the configuration of the flood attack judgment module according to the first embodiment of this invention.

FIG. 13 is a block diagram for illustrating an example of the configuration of the flood attack judgment module 10314. The flood attack judgment module 10314 is configured to set a monitoring bandwidth (or a threshold) for judging occurrence of a flood attack for each flow defined by an instruction in a packet relating to a setting instruction transmitted from the administrator of the packet relay apparatus 100 or the analyzer 300 and addressed to the packet relay apparatus 100, and to judge that the attack type of the packet information 200 in which the bandwidth of each flow exceeds the monitoring bandwidth is a flood attack.

The flood attack judgment module 10314 is constructed from a flow table 103140, a bandwidth table 103141, and a bandwidth judgment module 103142. The flow table 103140 is constructed from flow entries 1 (1031401) to n (103140*n*) for setting a condition for each flow defined by an instruction in a packet relating to a setting instruction transmitted from the administrator of the packet relay apparatus 100 or the analyzer 300 and addressed to the packet relay apparatus 100. The bandwidth table 103141 is constructed from bandwidth entries 1 (1031411) to n (103141*n*), which include the monitoring bandwidths corresponding to respective flow entries and information for judging whether or not the bandwidth of each flow exceeds the monitoring bandwidth.

When the packet information 200 is input, the flood attack judgment module 10314 sequentially compares whether or not a condition required for judgment of a matching comparison with a flow entry (flow table 103140) among the packet information 200 matches the conditions of the flow entries 1 (1031401) to n (103140*n*). When there is a match with a flow entry n, the flood attack judgment module 10314 judges that the packet information 200 belongs to the flow entry n, and refers to the bandwidth entry n (103141*n*) corresponding to the flow entry n.

When the monitoring bandwidth and information for judging whether or not the bandwidth of each flow exceeds the monitoring bandwidth are read from the bandwidth entry n (103141*n*), the bandwidth judgment module 103142 judges whether or not the packet information 200 exceeds the monitoring bandwidth. When the packet information 200 exceeds the monitoring bandwidth, the attack type of the packet information 200 is judged to be a "flood attack (flow n)".

When a low-level monitoring bandwidth and a high-level monitoring bandwidth are provided as monitoring bandwidths, the value of the high-level monitoring bandwidth is set higher than the value of the low-level monitoring bandwidth. In such a case, when the low-level monitoring bandwidth is exceeded but the high-level monitoring bandwidth is not exceeded, the attack type of the packet information 200 is judged to be a "low-level flood attack (flow n)". When the high-level monitoring bandwidth is exceeded, the attack type of the packet information 200 is judged to be a "high-level flood attack (flow n)".

In this manner, the flood attack judgment module 10314 is capable of identifying a flood attack packet based on the feature amount of the flow.

Figure 14:
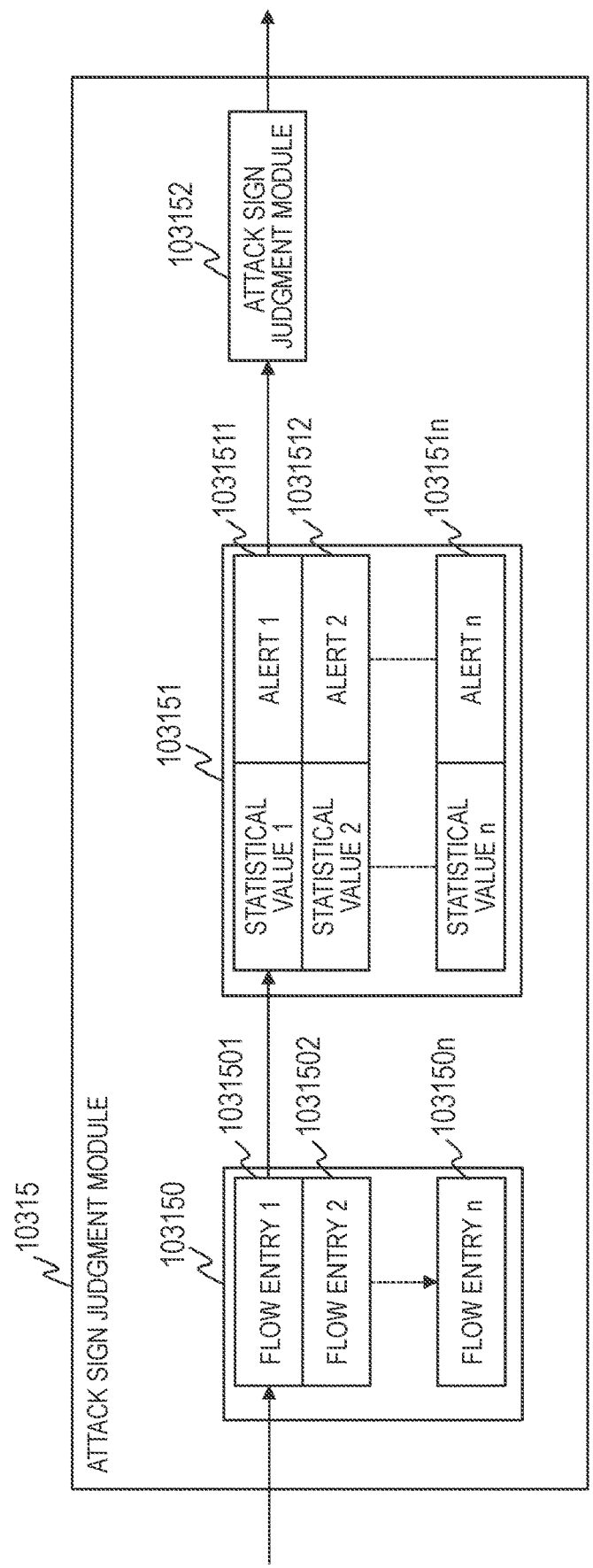
FIG. 14 is a block diagram for illustrating an example of the configuration of the attack sign judgment module according to the first embodiment of this invention.

FIG. 14 is a block diagram for illustrating an example of the configuration of the attack sign judgment module 10315. The attack sign judgment module 10315 is constructed from a flow table 103150, a statistics table 103151, and an attack sign judgment module 103152. The flow table 103150 is constructed from flow entries 1 (1031501) to n (103150n) for setting a condition for each flow defined by an instruction in a packet relating to a setting instruction transmitted from the administrator of the packet relay apparatus 100 or the analyzer 300 and addressed to the packet relay apparatus 100. The statistics table 103151 is constructed from statistics entries 1 (1031511) to n (103151n), which are constructed from statistical values 1 to n obtained by collecting a packet count, a byte count, and other such information corresponding to each flow entry, and alerts 1 to n for setting alerts relating to the statistical values 1 to n.

The control CPU 120 periodically reads the statistics table 103151, and when a characteristic statistical value pattern or access pattern thought to be an attack sign is detected, sets a value indicating a warning in an alert field of the read flow. The characteristic statistical value pattern or the access pattern is thought to be an attack sign in, for example, the following cases: when the temporal fluctuation of the statistical value of the read flow is abnormally large (e.g., when a count number of SYN packets in the read flow suddenly increases, there is a possibility of a SYN flood attack); when there is a characteristic statistical value indicating a possibility of a host scan by continuous access to a specific destination port including a plurality of destination IP addresses; when there is a characteristic statistical value indicating a possibility of a port scan by continuous access relating to a plurality of destination ports having a specific destination IP address; when among the reachable IP addresses, there is access to an unused IP address (e.g., darknet) to which a host has not been assigned (in most cases, access is a result of attack activity or illegitimate actions including host scanning); and when an abnormal message is detected based on an Internet control message protocol (ICMP) (detection of an access abnormality or a path abnormality, for example, that may be due to an attack by a message such as "host unreachable", "port unreachable", or "time exceeded" in the ICMP).

When the phenomenon thought to be an attack sign has not been detected for a certain time or more, a value not indicating a warning may be set in the alert field of the flow in which the warning has been set in the statistics table 103151. When an attack is detected based on an abnormality in protocol operation, a time scale characteristic to the protocol operation is used as the time scale to be used for the judgment of the temporal fluctuation of the statistical value. For example, TCP behavior depends on a round trip time (RTT), and hence the temporal fluctuation of the statistical value is judged based on a time order that is about the same as the round trip time.

When detecting a DDoS attack, the attack sign judgment module 10315 uses an average attack duration time as the time scale to be used to judge the temporal fluctuation of the statistical value. For example, when the average attack duration time is about 1 day, the attack sign judgment module 10315 judges the temporal fluctuation of the statistical value based on a time order of about 1 day. When the average attack duration time is about 1 hour, the attack sign judgment module 10315 judges the temporal fluctuation of the statistical value based on a time order of about 1 hour.

When the packet information 200 is input, the attack sign judgment module 10315 sequentially performs comparison for determining whether or not a condition required for judgment of a matching comparison with a flow entry among the packet information 200 matches the conditions of the flow entries 1 (1031501) to n (103150n). When there is a match with a flow entry n, the attack sign judgment module 10315 judges that the packet information 200 belongs to the flow entry n, and refers to the statistics entry n (103151n) corresponding to the flow entry n.

The attack sign judgment module 10315 adds to the statistical value n the packet count or the byte count of the packet information 200 in accordance with the type of the statistical value to be referred to. When the alert field of the referenced statistics entry n (103151n) is a value indicating a warning, the attack sign judgment module 103152 judges that the attack type of the packet information 200 is an "attack sign (flow n)".

In this manner, the attack sign judgment module 10315 is capable of identifying a packet that is an attack sign or is possibly an attack sign based on statistics information and the feature amount or the feature pattern of the flow.

Figure 15:
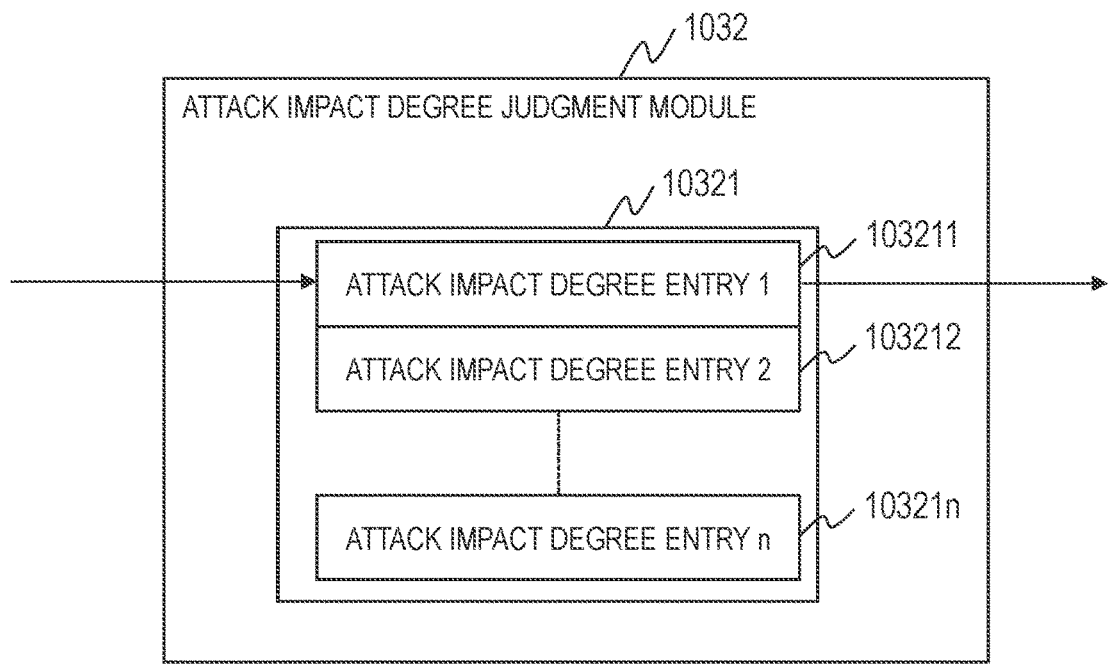
FIG. 15 is a block diagram for illustrating an example of the configuration of the attack impact degree judgment module according to the first embodiment of this invention.

FIG. 15 is a block diagram for illustrating an example of the configuration of the attack impact degree judgment module 1032 of the receiving-side security judgment module 103. The attack impact degree judgment module 1032 is constructed from an attack impact degree table 10321, which is constructed from attack impact degree entries 1 (103211) to n (10321n) for setting an attack impact degree for each attack type defined by an instruction in a packet relating to a setting instruction transmitted from the administrator of the packet relay apparatus 100 or the analyzer 300 and addressed to the packet relay apparatus 100.

The attack impact degree is an index for representing a severity level of damage by the attack. An attack impact degree for each attack type may be set from the management terminal 121 based on a policy defined by an instruction in a packet relating to a setting instruction transmitted from the administrator of the packet relay apparatus 100 or the analyzer 300 and addressed to the packet relay apparatus 100. For example, when an attack sign is not yet an actual attack, a low attack impact degree may be set, or among flood attacks, the attack impact degree may be set higher for flows including a large monitoring bandwidth than for flows including a small monitoring bandwidth.

When the attack type information 221 judged by the attack type judgment module 1031 is input to the attack impact degree judgment module 1032, the attack impact degree judgment module 1032 refers to the attack impact degree entry 1 (103211) to n (10321n) in the attack impact degree table 10321 corresponding to the attack type information 221. The attack impact degree corresponding to the attack type information 221 is set in advance in each attack impact degree entry 1 (103211) to n (10321n), and a judgment result of the attack impact degree is output as the attack impact degree information 222 in the packet information 250.

Figure 16:
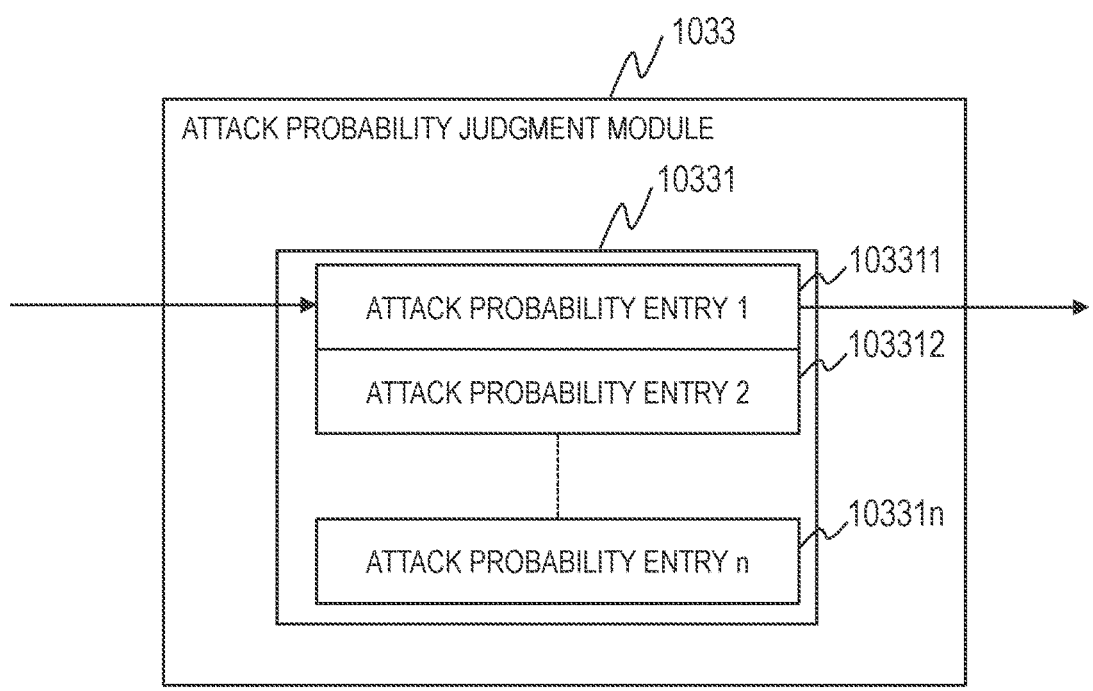
FIG. 16 is a block diagram for illustrating an example of the configuration of the attack probability judgment module according to the first embodiment of this invention.

FIG. 16 is a block diagram for illustrating an example of the configuration of the attack probability judgment module 1033 of the receiving-side security judgment module 103. The attack probability judgment module 1033 is constructed from an attack probability table 10331, which is constructed from attack probability entries 1 (103311) to n (10331n) for setting an attack probability for each attack type defined by an instruction in a packet relating to a setting instruction transmitted from the administrator of the packet relay apparatus 100 or the analyzer 300 and addressed to the packet relay apparatus 100.

The attack probability is an index for representing the level of probability relating to the possibility of an attack. An attack probability for each attack type may be set from the management terminal 121 based on a policy defined by an instruction in a packet relating to a setting instruction transmitted from the administrator of the packet relay apparatus 100 or the analyzer 300 and addressed to the packet relay apparatus 100. For example, when an attack sign is not yet an actual attack, a low attack probability may be set. For a flood attack, there are cases in which there is a mixture of communication suspected to be an attack and normal communication that is not suspected to be an attack. However, a logic attack may be considered to be a definite attack because the packets have an abnormal header that is normally impossible. Therefore, a higher attack probability is set for a logic attack. Among flood attacks, the attack probability may be set higher for flows including a large monitoring bandwidth than for flows including a small monitoring bandwidth.

When the attack type information 221 judged by the attack type judgment module 1031 is input to the attack probability judgment module 1033, the attack probability judgment module 1033 refers to the attack probability entries 1 (103311) to n (10331n) in the attack probability table 10331 corresponding to the attack type information 221. The attack probability corresponding to the attack type information 221 is set in each attack probability entry 1 to n, and a judgment result of the attack probability is output as the attack probability information 223 in the packet information 250.

The attack path information 224, which is information for identifying the attack path, is constructed from the input port information 201 and the output port information 202. The receiving-side security judgment module 103 is configured to output the input port information 201 and the output port information 202 in the packet information 200 as the attack path information 224 in the packet information 250.

When the judgment processing described above performed by the receiving-side security judgment module 103 is complete, the packet information 250 (illustrated in FIG. 5) including the attack type information 221, the attack impact degree information 222, the attack probability information 223, and the attack path information 224 is input to the receiving-side mirror processing module 104.

The configuration of the receiving-side mirror processing module 104 is as described above with reference to FIG. 6.

Figure 17:
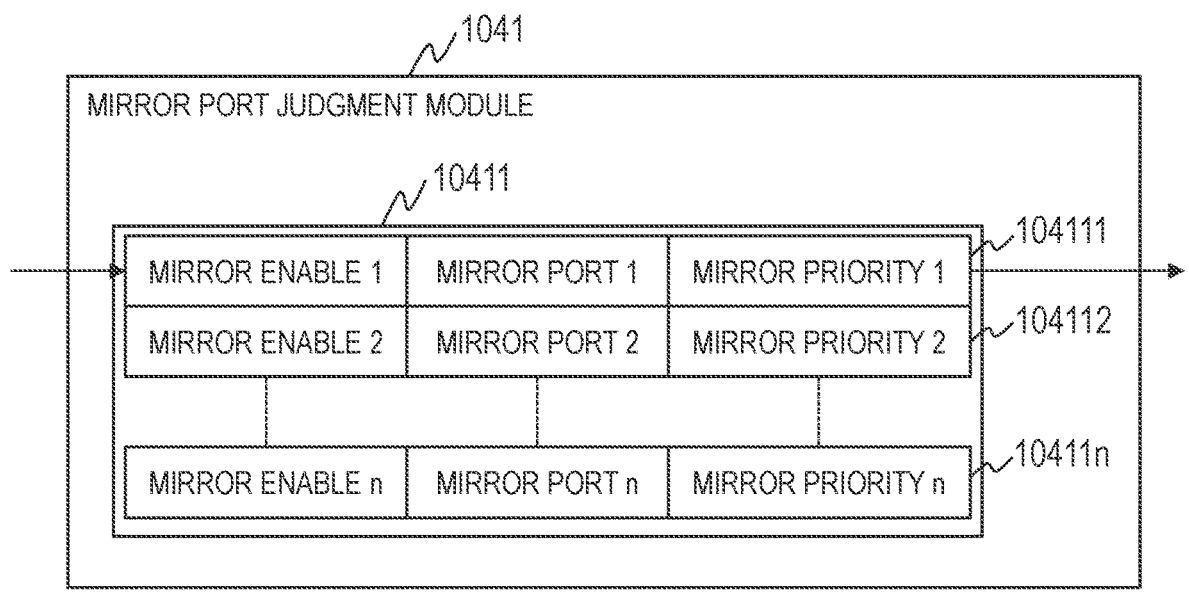
FIG. 17 is a block diagram for illustrating an example of the configuration of the mirror port judgment module according to the first embodiment of this invention.

FIG. 17 is a block diagram for illustrating an example of the configuration of the mirror port judgment module 1041 of the receiving-side mirror processing module 104. The mirror port judgment module 1041 includes a mirror table 10411 constructed from a mirror enable field, which is for setting whether or not each combination of the attack type information 221, the attack impact degree information 222, the attack probability information 223, and the attack path information 224 in the packet information 250 is to be mirrored, the mirror port 132, and mirror entries 1 (104111) to n (10411n) for setting a mirror priority. In the mirror enable field, "enable" indicates that a mirror packet is to be generated, and "disable" indicates that a mirror packet is not to be generated.

When the packet information 250 is input to the mirror port judgment module 1041, the mirror port judgment module 1041 refers to the mirror entries 1 (104111) to n (10411n) corresponding to the attack type information 221, the attack impact degree information 222, the attack probability information 223, and the attack path information 224 in the packet information 250, and reads the mirror enable field, the mirror port, and the mirror priority for that packet information 250. Then, the content of the mirror enable field is written in the mirror flag 231 of packet information 280 (illustrated in FIG. 21) by the mirror port judgment module 1041, the attack information addition judgment module 1042, and the receiving mirror packet generation module 1043.

Figure 21:
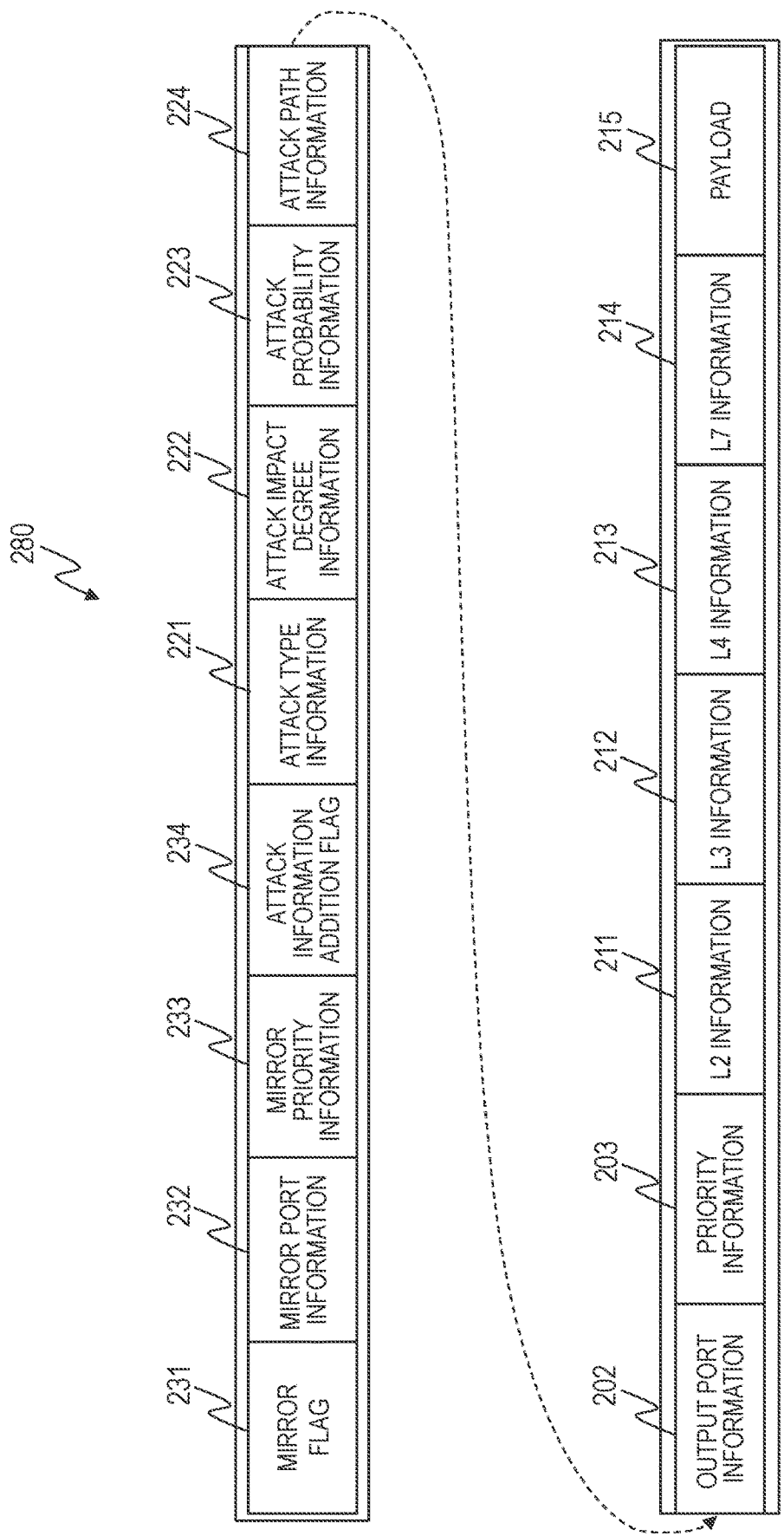
FIG. 21 is a diagram for illustrating an example of packet information from the mirror port judgment module according to the first embodiment of this invention.

In FIG. 21, when the mirror flag 231 is a value indicating execution of mirroring (enable), the mirror port 132 is set in the mirror port information 232 and the mirror priority is set in the mirror priority information 233. The attack information addition flag 234 is a value set by the attack information addition judgment module 1042, which is described later. The values in the packet information 250 are written in the other fields.

When the mirror flag 231 is a value indicating stop of mirroring (disable), the mirror port information 232 and the mirror priority information 233 are values that cannot be referred to, and the attack information addition flag 234 is set to a value indicating that attack information is not to be added. The values in the packet information 250 are written in the other fields.

Regarding the setting of the mirror table 10411, in order to suppress a load in accordance with the performance of each analyzer 300, for example, the mirror table 10411 may be set such that, based on an instruction in a packet relating to a setting instruction transmitted from the administrator of the packet relay apparatus 100 or the analyzer 300 and addressed to the packet relay apparatus 100, only packets of an attack type judged as including a high analysis importance are to be mirrored, or only packets including a high attack impact degree are to be mirrored, or only packets including a high attack probability are to be mirrored, or all mirror entries in which the mirror port 132 is coupled to the analyzer 300 including a high performance are to be mirrored, for example.

Another example of the setting operation is to set the mirror table 10411 such that the packets are mirrored in the analyzer 300 that is optimal for the attack type, by setting a mirror port 132 coupled to a DDoS attack countermeasure apparatus (not shown) for a flood attack in which a DDoS attack is used, and setting a different mirror port 132 for other attacks.

Figure 18:
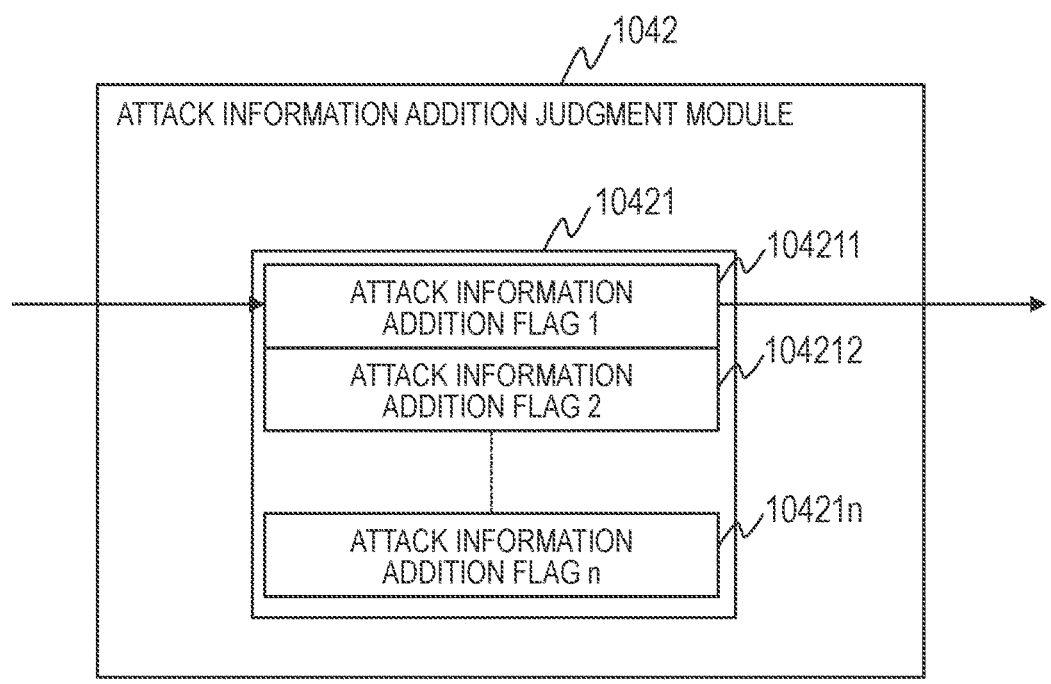
FIG. 18 is a block diagram for illustrating an example of the configuration of the attack information addition judgment module according to the first embodiment of this invention.

FIG. 18 is a block diagram for illustrating an example of the configuration of the attack information addition judgment module 1042. The attack information addition judgment module 1042 includes an attack information addition table 10421 constructed from attack information addition flags 1 (104211) to n (10421n) for setting whether or not the attack type information 221, the attack impact degree information 222, the attack probability information 223, and the attack path information 224 are to be added to the mirror packet for each mirror port judged by the mirror port judgment module 1041.

When the mirror port information judged by the mirror port judgment module 1041 is input to the attack information addition judgment module 1042 and the mirror flag 231 in the packet information 280 is a value indicating execution of mirroring, the attack information addition judgment module 1042 reads the attack information addition flag 1 (104211) to n (10421n) in the attack information addition table 10421 corresponding to the mirror port 132, and writes the content of the read attack information addition flag in the attack information addition flag 234 in the packet information 280.

When the mirror flag 231 in the packet information 280 is a value indicating stop of mirroring, the processing for reading the attack information addition table 10421 is not performed, and the attack information addition flag 234 in the packet information 280 is kept as a value indicating that the attack information is not to be added.

Figure 19:
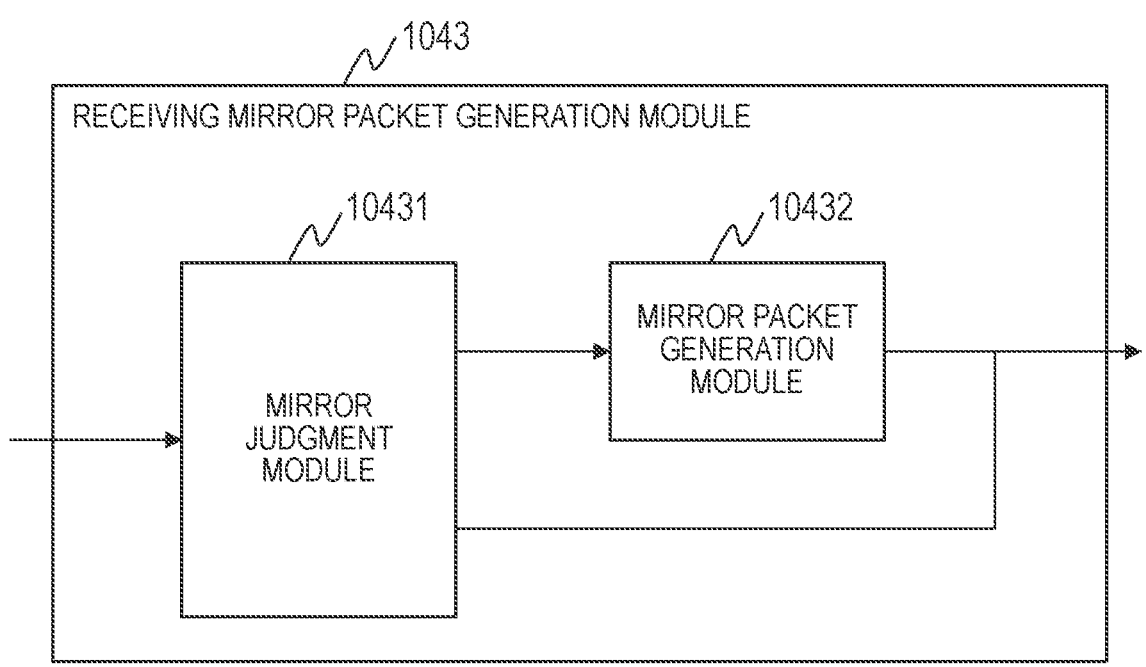
FIG. 19 is a block diagram for illustrating an example of the configuration of the receiving mirror packet generation module according to the first embodiment of this invention.

FIG. 19 is a block diagram for illustrating an example of the configuration of the receiving mirror packet generation module 1043. The receiving mirror packet generation module 1043 is constructed from a mirror judgment module 10431 and a mirror packet generation module 10432. The mirror judgment module 10431 is configured to instruct that a mirror packet is to be generated based on the mirror flag 231 judged by the mirror port judgment module 1041. The mirror packet generation module 10432 is configured to generate the mirror packet based on the instruction by the mirror judgment module 10431.

Figure 7:
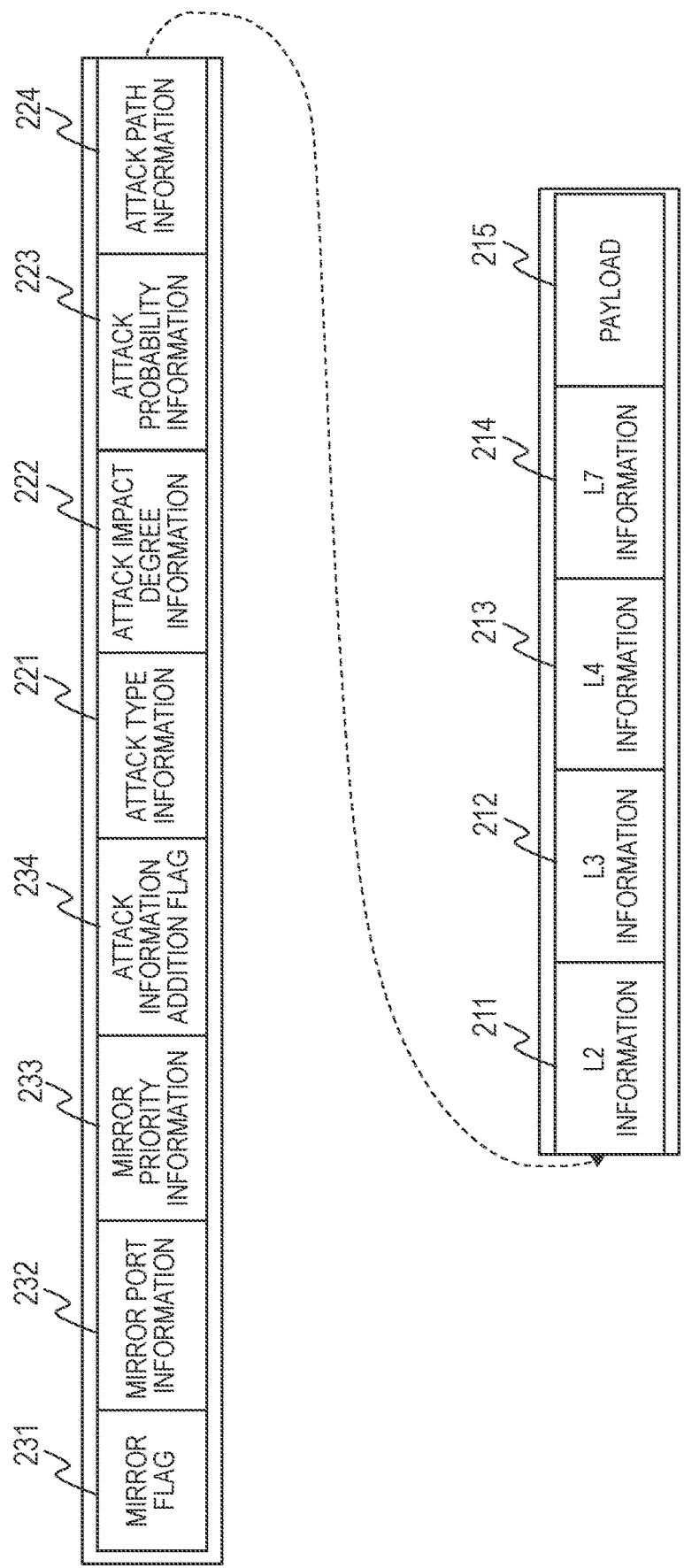
FIG. 7 is a diagram for illustrating an example of packet information according to the first embodiment of this invention.

When the packet information 280 is input to the receiving mirror packet generation module 1043, the mirror judgment module 10431 judges the mirror enable field, namely, whether or not a packet is to be generated based on the mirror flag 231 in the packet information 280. When the mirror flag 231 is a value for instructing execution of mirroring, the mirror packet generation module 10432 copies the packet information 260 (illustrated in FIG. 7), and outputs the packet information 260 out of the copied packet information 280 from which the output port information 202 and the priority information 203 have been deleted to the packet relay processing module 105 as a mirror packet.

In the original receiving packet, which is the copy source of the mirror packet, independently from the packet information 260 of the above-mentioned mirror packet, the mirror flag 231 in the packet information 280 (illustrated in FIG. 21) is set to a value indicating "invalid", and packet information 270 from which the mirror port information 232, the mirror priority information 233, the attack information addition flag 234, the attack type information 221, the attack impact degree information 222, the attack probability information 223, and the attack path information 224 have been deleted is output to the packet relay processing module 105.

When it is judged by the mirror port judgment module 1041 that a mirror packet is not to be generated, a receiving mirror packet is not generated, the mirror flag 231 in the packet information 280 is set to a value indicating "invalid", and packet information 270 from which the mirror port information 232, the mirror priority information 233, the attack information addition flag 234, the attack type information 221, the attack impact degree information 222, the attack probability information 223, and the attack path information 224 have been deleted is output to the packet relay processing module 105.

The packet information 260 or the packet information 270 input to the transmitting-side packet processing module 106 from the packet relay processing module 105 is subjected to the processing and the judgment by the transmitting-side security judgment module 107 and the transmitting-side mirror processing module 108 as described above, and the resultant packet information is output to the packet transmitting module 109.

The mirror flag 231 of the packet information 260 or the packet information 270 input to the packet transmitting module 109 is judged by the mirror packet judgment module 1091. When the mirror flag 231 is a value indicating execution of mirroring, the packet information is judged to be the packet information 260 of a mirror packet. The packet information 260 is output to the mirror policing module 1092 to limit the mirror packet bandwidth.

Next, at the packet transmitting module 109, the packet information 260 is input to the mirror shaping module 1093 to limit and smooth the mirror packet bandwidth. Next, the packet information 260 is input to the mirror sampling module 1094, the mirror packets at a ratio in accordance with a specified sampling rate are transferred, and the remaining mirror packets are discarded. When the mirror flag 231 is a value indicating stop of mirroring, the packet information is judged to be the packet information 270, which is not for a mirror packet, and the packet information 270 is output to the shaping module 1095.

Figure 22:
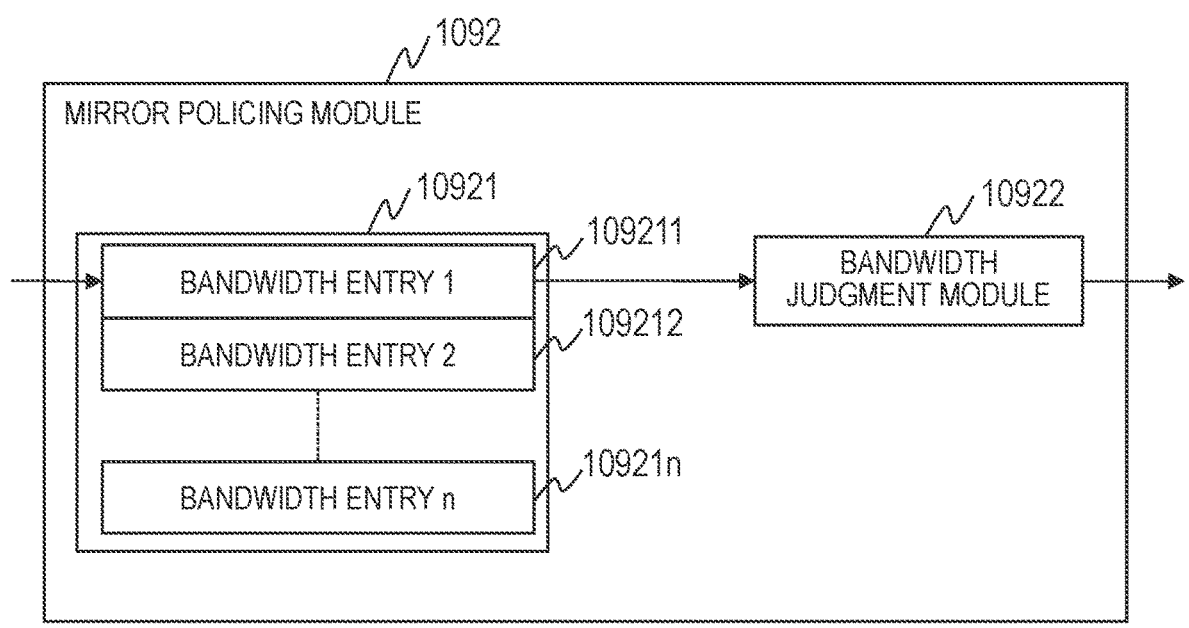
FIG. 22 is a block diagram for illustrating an example of the configuration of the mirror policing module according to the first embodiment of this invention.

FIG. 22 is a block diagram for illustrating an example of the configuration of the mirror policing module 1092. The mirror policing module 1092 is constructed from a bandwidth table 10921 and a bandwidth judgment module 10922. The bandwidth table 10921 is constructed from bandwidth entries 1 (109211) to n (10921n), in which a limited bandwidth is set for each mirror port 132.

The limited bandwidth of each mirror port 132 in the bandwidth table 10921 is set by the control CPU 120 based on an instruction in a packet relating to a setting instruction transmitted from the administrator of the packet relay apparatus 100 or the analyzer 300 and addressed to the packet relay apparatus 100.

When the packet information 260 is input, the mirror policing module 1092 refers to the bandwidth entry 1 (109211) to the bandwidth entry n (10921n) corresponding to the mirror port information 232 in the packet information 260. The bandwidth judgment module 10922 judges whether or not the packet information 260 exceeds the monitoring bandwidth when the monitoring bandwidth and the information for judging whether or not the bandwidth of each mirror port 132 exceeds the monitoring bandwidth are read by the mirror policing module 1092 from the bandwidth entry 1 (109211) to the bandwidth entry n (10921n).

The monitoring bandwidth is set by the control CPU 120 based on an instruction in a packet relating to a setting instruction transmitted from the administrator of the packet relay apparatus 100 or the analyzer 300 and addressed to the packet relay apparatus 100. When the monitoring bandwidth is exceeded, the mirror policing module 1092 is configured to discards the packet information 260 without transferring the packet information 260, and when the monitoring bandwidth is not exceeded, inputs the packet information 260 to the mirror shaping module 1093.

Figure 23:
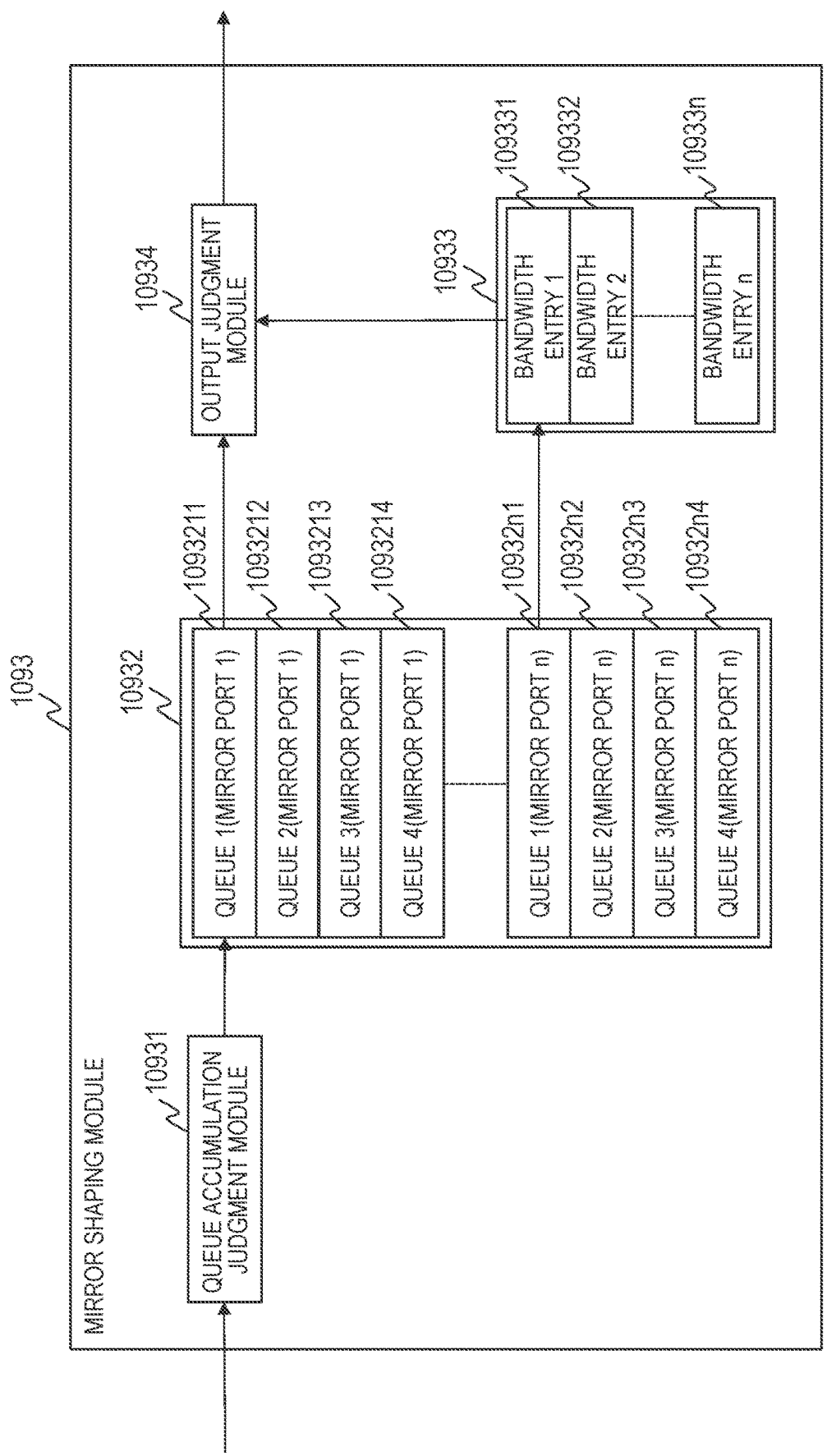
FIG. 23 is a block diagram for illustrating an example of the configuration of the mirror shaping module according to the first embodiment of this invention.

FIG. 23 is a block diagram for illustrating an example of the configuration of the mirror shaping module 1093. The mirror shaping module 1093 is constructed from a queue accumulation judgment module 10931, a queue 10932, a bandwidth table 10933, and an output judgment module 10934. The queue accumulation judgment module 10931 is configured to judge in which queue the packet information 260 is to be accumulated. The queue 10932 includes four queues for each mirror port 132. The bandwidth table 10933 is constructed from bandwidth entries 1 (109331) to n (10933n) in which an output bandwidth is set for each mirror port 132. The output judgment module 10934 is configured to judge an output timing.

The output bandwidth for each mirror port 132 in the bandwidth table 10933 is set by the control CPU 120 based on an instruction in a packet relating to a setting instruction transmitted from the administrator of the packet relay apparatus 100 or the analyzer 300 and addressed to the packet relay apparatus 100.

When the packet information 260 is input to the mirror shaping module 1093, the queue accumulation judgment module 10931 judges the queue corresponding to the mirror port information 232 and the mirror priority information 233 among the packet information 260, and accumulates the packet information 260 in the judged queue. For example, when the mirror port information is a mirror port 1 (132-1), and the mirror priority information is a queue 2, the packet information 260 is accumulated in the queue 2 (mirror port 1) 1093212 queue.

Meanwhile, the output judgment module 10934 judges, independently of the input timing of the packet information 260 to the mirror shaping module 1093, the output bandwidth for each mirror port 132 by referring to the bandwidth table 10933 in which the output bandwidth for each mirror port 132 is set, and judges the mirror port 132 and the output timing for next outputting the packet information 260 based on the output bandwidth of each mirror port 132 so that the mirror packet bandwidth after the shaping may be smooth traffic without bursts.

The output judgment module 10934 outputs, when packets are accumulated in a plurality of the queues 10932 of the mirror port 132 from which the packets are to be output, the packet information 260 from a queue (j) including a small value for (j) at an appropriate output timing. In this manner, priority control relating to mirror packet transmission based on the mirror priority information 233 is implemented.

Figure 24:
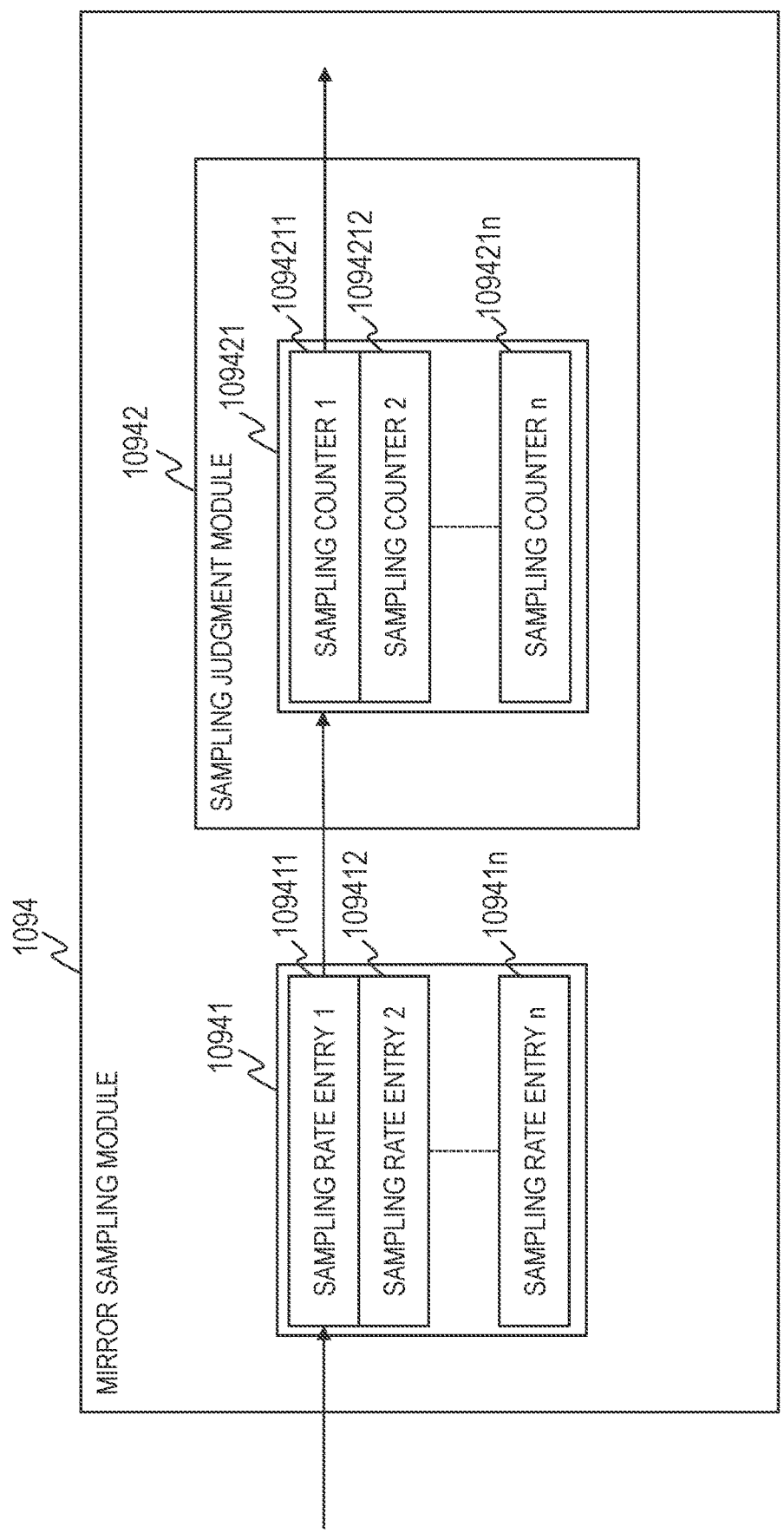
FIG. 24 is a block diagram for illustrating an example of the configuration of the mirror sampling module according to the first embodiment of this invention.

FIG. 24 is a block diagram for illustrating an example of the configuration of the mirror sampling module 1094. The mirror sampling module 1094 is constructed from a sampling rate table 10941 and a sampling judgment module 10942. The sampling rate table 10941 is constructed from sampling rate entries 1 (109411) to n (10941n), in which a sampling rate is set for each of the attack type information 221, the attack impact degree information 222, the attack probability information 223, and the attack path information 224. The sampling judgment module 10942 is configured to judge whether or not to output the packet information 260 obtained as a result of the sampling.

The sampling rate of each of the attack type information 221, the attack impact degree information 222, the attack probability information 223, and the attack path information 224 in the sampling rate table 10941 is set by the control CPU 120 based on an instruction in a packet relating to a setting instruction transmitted from the administrator of the packet relay apparatus 100 or the analyzer 300 and addressed to the packet relay apparatus 100.

For example, when a flood attack load is high, the load on the analyzer 300 is also high unless the sampling rate is reduced. Therefore, the packet transmitting module 109 may issue an instruction packet for adjusting the sampling rate of the packet relay apparatus 100 from the analyzer 300 in accordance with the mirror packet load to be received by the analyzer 300.

Another method is to monitor the flood attack load with the control CPU 120 by using the statistics function (not shown) of the packet relay apparatus 100, and to autonomously adjust to a sampling rate in accordance with the load by the packet relay apparatus 100. Regarding the method for determining the sampling rate, the load on the analyzer 300 can be suppressed to less than two times the load of a case where the flood attack occurs by, for example, changing the sampling rate value to $(½)^n$ times the pre-correction sampling rate value based on the bandwidth judged as being a flood attack as a reference each time the load exceeds a threshold that is $2^n$ times the reference.

On the other hand, when the load has decreased, the packet amount to be monitored can be maintained in a range in which the load on the analyzer 300 is not excessive, by increasing the sampling rate. For example, based on the bandwidth judged as being a flood attack as a reference, the load on the analyzer 300 of the mirror packet amount to be analyzed by the analyzer 300 can be maintained at a level equal to or higher than that of the case where a flood attack occurs by changing the sampling rate value to $2^n$ times the pre-correction sampling rate value each time the load falls below a threshold that is $2^n$ times the reference.

When the packet information 260 is input, the mirror sampling module 1094 refers to the sampling rate entry 1 (109411) to the sampling rate entry n (10941n) corresponding to the attack type information 221, the attack impact degree information 222, the attack probability information 223, and the attack path information 224 in the packet information 260, and outputs the sampling rate corresponding to the packet information 260 to the sampling judgment module 10942.

The sampling judgment module 10942 includes a sampling counter table 109421 constructed from sampling counters 1 (1094211) to n (109421n) for each sampling rate entry.

The sampling judgment module 10942 adds 1 to the sampling counter when the packet information 260 and the sampling rate corresponding to the packet information 260 are input to the sampling judgment module 10942, and to judge whether or not to output the packet information 260 by referring to the resultant sampling counter. For example, when the sampling rate is ¼, sampling control for outputting the packet information 260 at the sampling rate can be implemented by outputting the packet information 260 when the sampling counter reaches 3 and wrapping the sampling counter around back to 0, and when the sampling counter is a value other than 3, judging that the packet information 260 is not to be output.

Based on the processing described above, the load on the analyzer 300 can be appropriately maintained by preventing the load on the analyzer 300 from becoming too excessive and preventing a decrease in the load from becoming too excessive.

In this manner, the packet relay apparatus 100 of the first embodiment is capable of outputting to the mirror port 132, among the receiving packets and the transmitting packets, only the packets judged as possibly being an attack or an attack sign. As a result, the load on the analyzer 300 coupled to the mirror port 132 can be reduced. In addition, information on the attack or the attack sign is included in the mirror packet to be output from the mirror port 132, and hence the need to judge that information by the analyzer 300 is eliminated. Thus, the load on the analyzer 300 can be further reduced.

In the first embodiment, the packets judged as possibly being an attack or an attack sign are packets that are a threat or are possibly a threat, and include packets that perform an attack, packets that possibly perform an attack, packets that are an attack sign, and packets that are possibly an attack sign.

The packet relay apparatus 100 is capable of reducing the load on each analyzer 300 by limiting an attack type or other such condition of the packet to be analyzed by a plurality of analyzers 300 by transmitting, from a plurality of mirror ports 132 that are different from each other, a plurality of mirror packets copied from the same packet.

The packet relay apparatus 100 includes a plurality of mirror ports 132, and hence analysis of an attack or an attack sign can be shared among the plurality of analyzers 300 by the packet transmitting module 109 outputting mirror packets to each mirror port 132 based on a round-robin method or a hash method for each attack type.

The packet relay apparatus 100 includes the plurality of mirror ports 132, and hence analysis of an attack or an attack sign can be shared among the analyzers 300 specified for each attack type, and analysis accuracy can be improved, by outputting mirror packets to the mirror ports 132-1 to 132-n set in advance for each attack type.

The packet relay apparatus 100 is also capable of adjusting and reducing the load on the analyzers 300 by adjusting, for each attack type, a ratio at which the mirror packet is to be copied.

The packet relay apparatus 100 is also capable of adjusting and reducing the load on the analyzers 300 by performing shaping or policing on the mirror packets for each attack type judged by the packet relay apparatus 100, and transmitting the shaped or policed mirror packets from the mirror port.

The packet relay apparatus 100 is also capable of mirroring packets in a prioritized manner by judging the priority when performing shaping or policing on the mirror packets based on a judgment result of any of the attack type, the attack sign type, the impact degree of the attack or the attack sign, and the probability of the attack or the attack sign.

Modification Example

Figure 25:
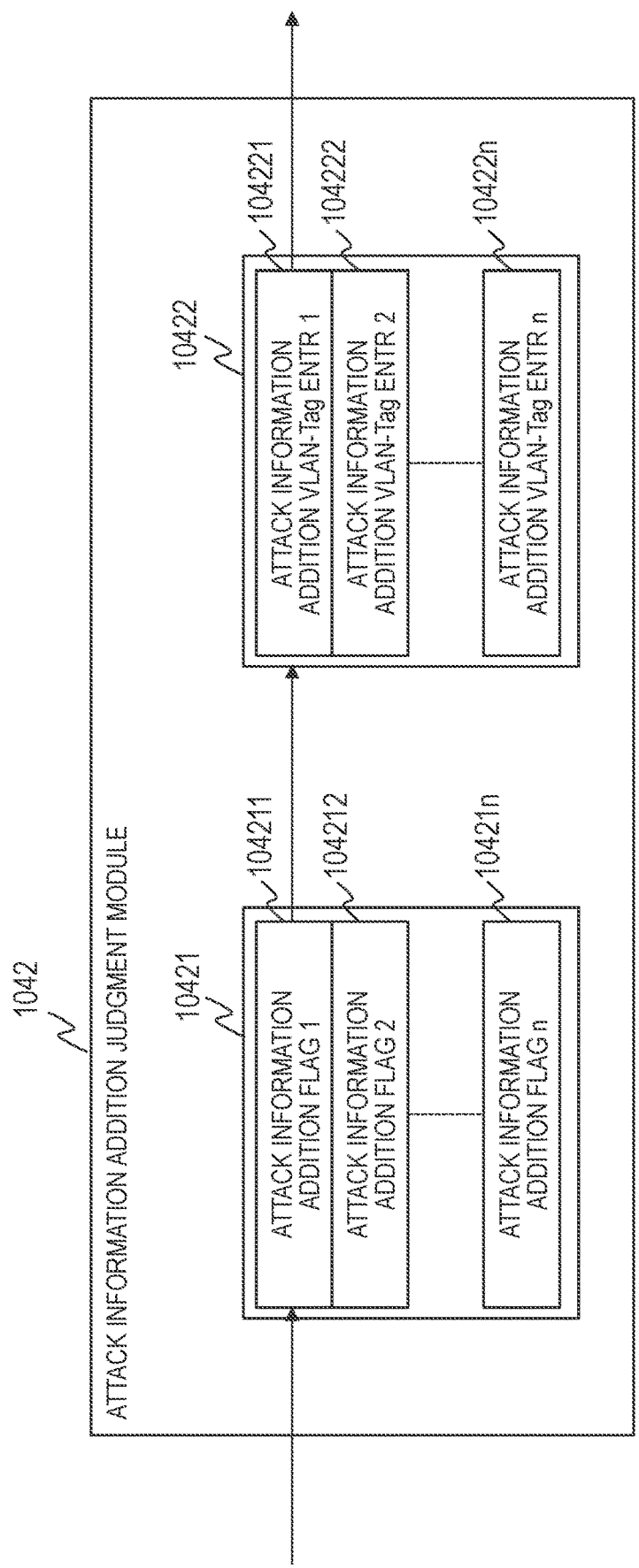
FIG. 25 is a diagram for illustrating a modification example of the attack information addition judgment module according to the first embodiment of this invention.

FIG. 25 is a diagram for illustrating a modification example of the attack information addition judgment module 1042. In FIG. 25, there is illustrated an example in which attack information is added by a virtual local area network (VLAN)-tag defined by Institute of Electrical and Electronics Engineers (IEEE) 802.1Q.

In the case of adding attack information by a VLAN-tag defined by IEEE 802.1Q, as illustrated in FIG. 25, an attack information addition VLAN-tag table 10422 is added to the attack information addition judgment module 1042.

The attack information addition VLAN-tag table 10422 is constructed from attack information addition VLAN-tag entries 1 (104221) to n (10422n), in which a VLAN ID, a user priority, or both the VLAN ID and the user priority, is/are set as an identifier corresponding to each combination of the attack type information 221, the attack impact degree information 222, the attack probability information 223, and the attack path information 224.

When the mirror port information judged by the mirror port judgment module 1041 is input to the attack information addition judgment module 1042, and the mirror flag 231 in the packet information 280 is a value indicating execution of mirroring, the attack information addition judgment module 1042 reads the attack information addition flag 1 to the attack information addition flag n in the attack information addition table 10421 corresponding to the mirror port 132, and writes the attack information addition flag 1 to the attack information addition flag n in the attack information addition flag 234 of the packet information 280.

The attack information addition judgment module 1042 refers to the attack information addition VLAN-tag table 10422 based on the attack type information 221, the attack impact degree information 222, the attack probability information 223, and the attack path information 224 in the packet information 280, and reads the VLAN ID, the user priority, or both the VLAN ID and the user priority, as the identifier corresponding to the combination of the attack type information 221, the attack impact degree information 222, the attack probability information 223, and the attack path information 224.

The attack information addition judgment module 1042 adds to the L2 information 211 in the packet information 280 the VLAN-tag of the read VLAN ID or user priority. A tag protocol identifier (TPID) of the VLAN-tag to be added is the same TPID as the TPID set in the analyzer 300 as a value that can be interpreted by the analyzer 300 coupled to the mirror port 132 as being attack information in which the VLAN-tag to be added has been added by the packet relay apparatus 100 according to this invention.

Figure 26:
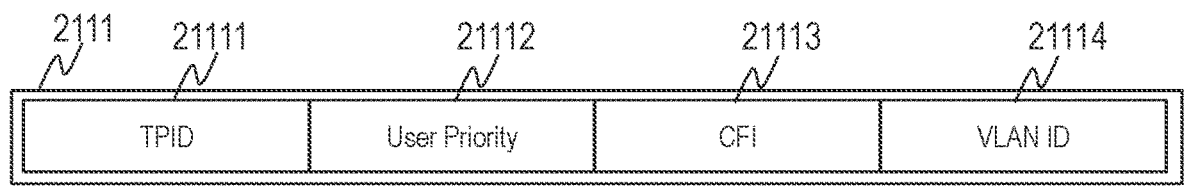
FIG. 26 is a diagram for illustrating a format of the VLAN-tag according to the first embodiment of this invention.

A format of the VLAN-tag is illustrated in FIG. 26. When the mirror flag 231 of the packet information 280 is a value indicating stop of mirroring, the processing for reading the attack information addition table 10421 is not performed, and the value set in the attack information addition flag 234 of the packet information 280 is kept as a value indicating that the attack information is not to be added. When one VLAN-tag is insufficient for the addition of the attack information because there is a large amount of attack information to be added, two or more VLAN-tags may be added.

In this manner, in the packet relay apparatus 100, the attack information may be added to a VLAN-tag, and the attack information may be notified to the analyzer 300 by the VLAN-tag of the mirror packet.

Second Embodiment

Figure 27:
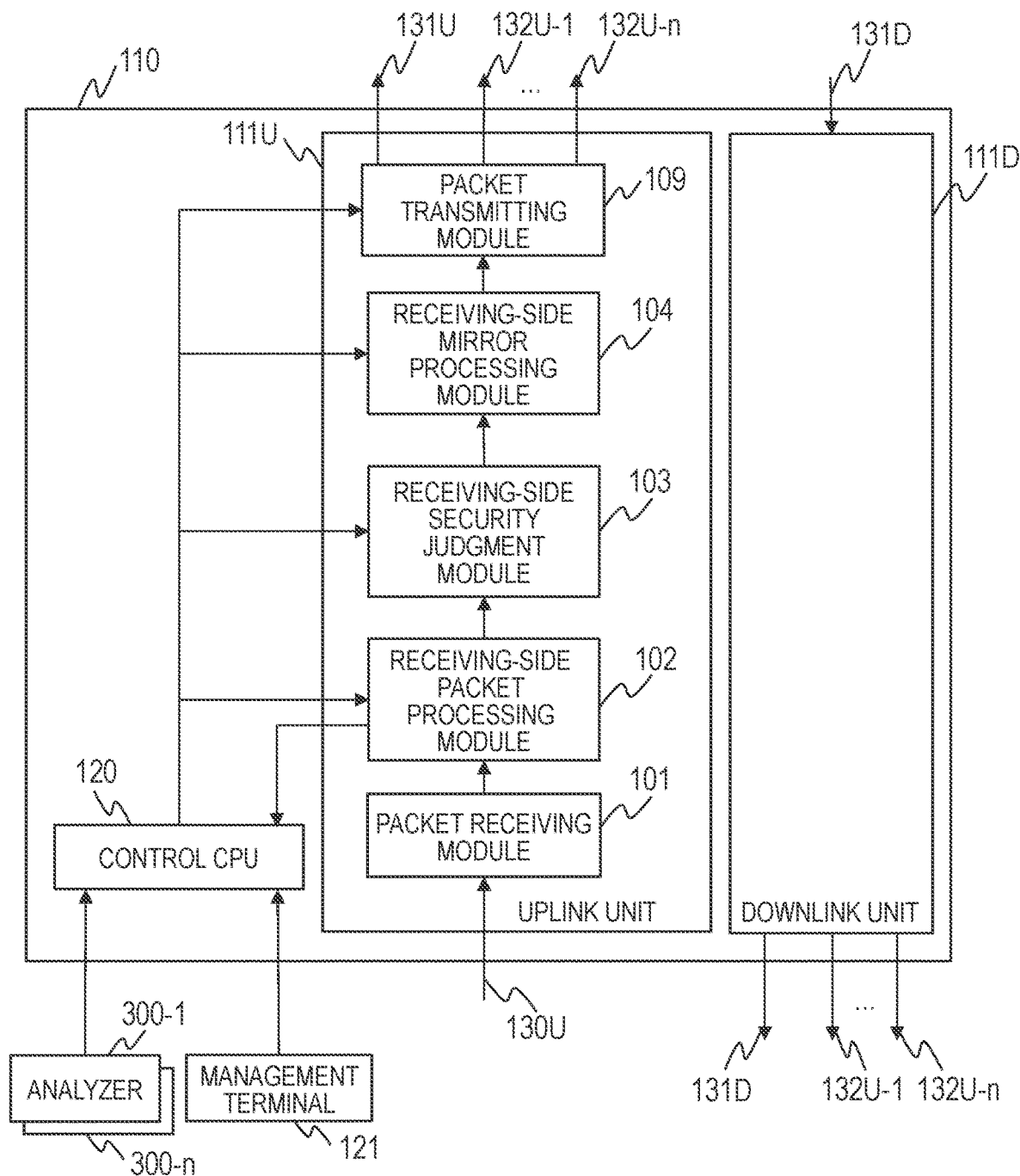
FIG. 27 is a block diagram for illustrating a second embodiment of this invention, in which an example of a network tap is illustrated as another example of a packet relay apparatus.

FIG. 27 is a block diagram for illustrating a second embodiment of this invention, in which an example of a network tap is illustrated as another example of a packet relay apparatus. A network tap 110 of the second embodiment does not perform packet routing or switching, and is arranged between the packet relay apparatus and a computer, for example. The network tap 110 is configured to detect packets that are possibly an attack or an attack sign, and to output the detected packets to mirror ports 132U-1 to 132U-n. The input packets are transferred as they are from the input port to the output port.

The network tap 110 includes an uplink unit 111U configured to process uplink-direction packets and a downlink unit 111D configured to process downlink-direction packets. The uplink unit 111U and the downlink unit 111D have the same configuration, and hence in the following description, the uplink unit 111U is described, and a description of the downlink unit 111D is omitted.

The uplink unit 111U of the network tap 110 includes an input port 130U, an output port 131U, and a plurality of mirror ports 132U to 132U-n.

The uplink unit 111U is configured to output from the output port 131U packets received by the input port 130U, and similarly to the packet relay apparatus 100 of the first embodiment, output a replica of packets that are possibly an attack or an attack sign from the mirror ports 132U-1 to 132U-n. Similarly to the first embodiment, the mirror packets output from the mirror ports 132U include information on the attack or the attack sign.

The uplink unit 111U has a similar receiving side to that of the packet relay apparatus 100 described in the first embodiment, but is different from the first embodiment in that the packet transmitting module 109 is arranged downstream of the receiving-side mirror processing module 104.

The packet receiving module 101 configured to receive the packets from the input port 130U, the receiving-side packet processing module 102, the receiving-side security judgment module 103, and the receiving-side mirror processing module 104 are the same as those in the first embodiment. However, the second embodiment is different from the first embodiment in that the transmission source spoofing attack judgment module 10313 is not included in the attack type judgment module 1031 of the receiving-side security judgment module 103.

The network tap 110 of the second embodiment functions in the same manner as that of the first embodiment, allowing only packets judged as possibly being an attack or an attack sign among the receiving packets or the transmitting packets to be output to each mirror port 132U. As a result, the load on the analyzer 300 coupled to each mirror port 132U can be reduced. Further, information on the attack or the attack sign is included in the mirror packets output from each mirror port 132U, and hence the need to judge that information by the analyzer 300 is eliminated, which allows the load on the analyzer to be further reduced.

Conclusion

The above-mentioned packet relay apparatus 100 can be used as the following application examples.

Application Example 1

A packet relay apparatus configured to perform mirroring by transmitting from a mirror port a mirror packet copied from one of a receiving packet and a transmitting packet, in which, of the receiving packet and the transmitting packet, only a packet judged as possibly being one of an attack and an attack sign is mirrored.

The packet relay apparatus of Application Example 1 is capable of mirroring in an analyzer only the packet judged by the packet relay apparatus as possibly being one of an attack and an attack sign, and hence the load on the analyzer can be reduced.

Application Example 2

The packet relay apparatus of Application Example 2 is the packet relay apparatus according to Application Example 1, in which mirroring is performed by adding information on the one of the attack and the attack sign judged by the packet relay apparatus to the mirror packet.

According to the packet relay apparatus of Application Example 2, the information on the one of the attack and the attack sign judged by the packet relay apparatus is included in the mirror packet to be received by the analyzer, and hence the need to judge that information by the analyzer is eliminated, which allows the load on the analyzer to be reduced.

Application Example 3

The packet relay apparatus of Application Example 3 is the packet relay apparatus according to Application Example 2, in which mirroring is performed by adding information on one of an attack type and an attack sign type judged by the packet relay apparatus to the mirror packet.

According to the packet relay apparatus of Application Example 3, the information on one of the attack type and the attack sign type judged by the packet relay apparatus is included in the mirror packet to be received by the analyzer, and hence the need to judge that information by the analyzer is eliminated, which allows the load on the analyzer to be reduced.

Application Example 4

The packet relay apparatus of Application Example 4 is the packet relay apparatus according to Application Example 2, in which mirroring is performed by adding information indicating an impact degree of the one of the attack and the attack sign judged by the packet relay apparatus to the mirror packet.

According to the packet relay apparatus of Application Example 4, the information indicating the impact degree of the one of the attack and the attack sign judged by the packet relay apparatus is included in the mirror packet to be received by the analyzer, and hence the need to judge that information by the analyzer is eliminated, which allows the load on the analyzer to be reduced.

Application Example 5

The packet relay apparatus of Application Example 5 is the packet relay apparatus according to Application Example 2, in which mirroring is performed by adding information indicating a probability of the one of the attack and the attack sign judged by the packet relay apparatus to the mirror packet.

According to the packet relay apparatus of Application Example 5, the information indicating the probability of the one of the attack and the attack sign judged by the packet relay apparatus is included in the mirror packet to be received by the analyzer, and hence the need to judge that information by the analyzer is eliminated, which allows the load on the analyzer to be reduced.

Application Example 6

The packet relay apparatus of Application Example 6 is the packet relay apparatus according to Application Example 2, in which mirroring is performed by adding information indicating an attack path of the one of the attack and the attack sign judged by the packet relay apparatus to the mirror packet.

According to the packet relay apparatus of Application Example 6, the information indicating the attack path of the one of the attack and the attack sign judged by the packet relay apparatus is included in the mirror packet to be received by the analyzer, and hence the need to judge that information by the analyzer is eliminated, which allows the load on the analyzer to be reduced.

Application Example 7

The packet relay apparatus of Application Example 7 is the packet relay apparatus according to any one of Application Example 1, in which the addition of the information to the mirror packet is performed by adding a VLAN-tag to the mirror packet, to thereby enable the information to be identified by one of a VLAN ID and a user priority of the added VLAN-tag.

According to the packet relay apparatus of Application Example 7, information can be identified based on the one of the VLAN ID and the user priority of the VLAN-tag added to the mirror packet to be received by the analyzer.

Application Example 8

The packet relay apparatus of Application Example 8 is the packet relay apparatus according to any one of Application Example 1, in which the packet relay apparatus is configured to judge a packet that is possibly one of an attack and an attack sign based on packet information.

The packet relay apparatus of Application Example 8 is capable of mirroring in the analyzer only the packets judged by the packet relay apparatus as possibly being the one of the attack and the attack sign based on packet information, and hence the load on the analyzer can be reduced.

Application Example 9

The packet relay apparatus of Application Example 9 is the packet relay apparatus according to any one of Application Example 1, in which the packet relay apparatus is configured to judge a packet that is possibly one of an attack and an attack sign based on a search result in a search table included in the packet relay apparatus.

The packet relay apparatus of Application Example 9 is capable of mirroring in the analyzer only the packets judged by the packet relay apparatus as possibly being the one of the attack and the attack sign based on a search result in a search table included in the packet relay apparatus, and hence the load on the analyzer can be reduced.

Application Example 10

The packet relay apparatus of Application Example 10 is the packet relay apparatus according to any one of Application Example 1, in which the packet relay apparatus is configured to judge a packet that is possibly one of an attack and an attack sign based on a feature pattern in packet information on a plurality of packets.

The packet relay apparatus of Application Example 10 is capable of mirroring in the analyzer only the packets judged by the packet relay apparatus as possibly being the one of the attack and the attack sign based on a feature pattern in packet information on a plurality of packets, and hence the load on the analyzer can be reduced.

Application Example 11

The packet relay apparatus of Application Example 11 is the packet relay apparatus according to any one of Application Example 1, in which the packet relay apparatus is configured to judge a packet that is possibly one of an attack and an attack sign based on a feature amount.

The packet relay apparatus of Application Example 10 is capable of mirroring in the analyzer only the packets judged by the packet relay apparatus as possibly being the one of the attack and the attack sign based on a feature amount, and hence the load on the analyzer can be reduced.

Application Example 12

The packet relay apparatus of Application Example 12 is the packet relay apparatus according to Application Example 11, in which the feature amount includes a packet byte length.

The packet relay apparatus of Application Example 12 is capable of mirroring in the analyzer only the packets judged by the packet relay apparatus as possibly being the one of the attack and the attack sign based on a feature amount, namely, the packet byte length, and hence the load on the analyzer can be reduced.

Application Example 13

The packet relay apparatus of Application Example 13 is the packet relay apparatus according to Application Example 11, in which the feature amount includes a packet bandwidth.

The packet relay apparatus of Application Example 13 is capable of mirroring in the analyzer only the packets judged by the packet relay apparatus as possibly being the one of the attack and the attack sign based on a feature amount, namely, the packet bandwidth, and hence the load on the analyzer can be reduced.

Application Example 14

The packet relay apparatus of Application Example 14 is the packet relay apparatus according to Application Example 11, in which the feature amount includes a statistic.

The packet relay apparatus of Application Example 14 is capable of mirroring in the analyzer only the packets judged by the packet relay apparatus as possibly being the one of the attack and the attack sign based on a feature amount, namely, the statistic, and hence the load on the analyzer can be reduced.

Application Example 15

The packet relay apparatus of Application Example 15 is the packet relay apparatus according to Application Example 3, in which the packet relay apparatus is configured to judge a packet that is possibly one of an attack and an attack sign based on a temporal fluctuation of the feature amount.

The packet relay apparatus of Application Example 15 is capable of mirroring in the analyzer only the packets judged by the packet relay apparatus as possibly being the one of the attack and the attack sign based on the temporal fluctuation of the feature amount, and hence the load on the analyzer can be reduced.

Application Example 16

The packet relay apparatus of Application Example 16 is the packet relay apparatus according to Application Example 3, in which a plurality of mirror packets copied from the same packet are transmitted from a plurality of mirror ports that are different from each other.

According to the packet relay apparatus of Application Example 16, mirroring can be performed by coupling analyzers to a plurality of mirror ports, which allows analysis of one of an attack and an attack sign to be shared among a plurality of analyzers. As a result, the packets and the conditions, for example, the attack type, to be analyzed by each analyzer can be limited, which allows the load on each analyzer to be reduced. The mirror packets may be classified based on each flow, and output from the mirror port 132.

Application Example 17

The packet relay apparatus of Application Example 17 is the packet relay apparatus according to Application Example 3, in which the packet relay apparatus includes a plurality of mirror ports, and the mirror port for transmitting the mirror packet is selected based on one of a hash algorithm and a round-robin algorithm for each of the attack types judged by the packet relay apparatus.

According to the packet relay apparatus of Application Example 17, mirroring can be performed by coupling analyzers to a plurality of mirror ports, which allows analysis of one of an attack and an attack sign to be shared among a plurality of analyzers. As a result, the packets and the conditions, for example, the attack type, to be analyzed by each analyzer can be limited, which allows the load on each analyzer to be reduced.

According to the packet relay apparatus of Application Example 16, the same mirror packet is transmitted to all the mirror ports. In contrast, with the packet relay apparatus of Application Example 17, each mirror packet is transmitted to one mirror port. Therefore, the packet relay apparatus of Application Example 17 can reduce the load on the analyzers more than the packet relay apparatus of Application Example 16.

Application Example 18

The packet relay apparatus of Application Example 18 is the packet relay apparatus according to Application Example 3, in which the mirror packet is transmitted from the mirror port by adjusting, for each attack type judged by the packet relay apparatus, a ratio of the receiving packet and the transmitting packet at which the mirror packet is to be copied.

According to the packet relay apparatus of Application Example 18, the load on the analyzer can be adjusted and reduced by adjusting the ratio for copying the mirror packets for each attack type judged by the packet relay apparatus.

Application Example 19

The packet relay apparatus of Application Example 19 is the packet relay apparatus according to Application Example 3, in which the mirror packet is transmitted from the mirror port after performing one of shaping and policing on the mirror packet for each attack type judged by the packet relay apparatus.

According to the packet relay apparatus of Application Example 19, the load on the analyzer can be adjusted and reduced by performing one of shaping and policing on the mirror packet for each attack type judged by the packet relay apparatus. In particular, in the case of shaping the mirror packet, the load on the analyzer can be adjusted and reduced, without mirror packet loss, within a range permitted by a buffer amount included in a shaper in the packet relay apparatus.

Application Example 20

The packet relay apparatus of Application Example 20 is the packet relay apparatus according to Application Example 19, in which a priority when performing one of shaping and policing on the mirror packet is judged based on a judgment result of any one of the attack type, the attack sign type, an impact degree of one of the attack type and the attack sign type, and a probability of one of the attack type and the attack sign type.

According to the packet relay apparatus of Application Example 20, when the buffer amount in the packet relay apparatus is insufficient because the mirror packet bandwidth is too large, and a portion of the mirror packets are discarded by the packet relay apparatus, the packets can be mirrored in a prioritized manner by judging the priority based on a judgment result of any of the attack type, the attack sign type, the impact degree of one of the attack and the attack sign, and the probability of one of the attack and the attack sign.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A packet relay apparatus comprising:
an input port;
a processor; and
a memory storing instructions that, when executed by the processor, cause the processor to execute:
 a packet receiving module configured to receive a packet from the input port;
 a security judgment module configured to judge whether or not the packet is one of an attack and an attack sign and judge information on one of an attack type and an attack sign type as information on the one of the attack and the attack sign;
 a mirror processing module configured to generate, when it is judged that the packet is one of the attack and the attack sign, a mirror packet which is a replica of the packet, and add the information on the one of the attack type and the attack sign type to the mirror packet; and
 a transmitting module configured to transmit the mirror packet from a mirror port, wherein the packet relay apparatus comprises a plurality of mirror ports including the mirror port, and
wherein the mirror processing module is further configured to determine to generate the mirror packet, determine the mirror port to transmit the mirror packet, and determine a priority to transmit the mirror packet based on a determination result of the security judgment module, and
wherein the determination result includes any one of attack type information, attack impact degree information, attack probability information, and attack path information,
wherein the transmitting module includes:
 a mirror policing module configured to limit a monitored bandwidth of the determined mirror port based on the determined mirror port,
 a mirror shaping module configured to shape transmission of the mirror packet based on the determined mirror port and the determined priority, and
 a mirror sampling module configured to transmit the mirror packet from the mirror port in accordance with a sampling rate based on the determination result of the security judgment module.

2. The packet relay apparatus according to claim 1,
wherein the security judgment module is configured to further judge information indicating an impact degree of one of an attack and an attack sign as the information on the one of the attack and the attack sign, and
wherein the mirror processing module is configured to further add the information indicating the impact degree of the one of the attack and the attack sign to the mirror packet.

3. The packet relay apparatus according to claim 1,
wherein the security judgment module is configured to further judge information indicating a probability of the one of the attack and the attack sign as the information on the one of the attack and the attack sign, and
wherein the mirror processing module is configured to further add the information indicating the probability of the one of the attack and the attack sign to the mirror packet.

4. The packet relay apparatus according to claim 1,
wherein the security judgment module is configured to further judge information indicating an attack path as the information on the one of the attack and the attack sign, and
wherein the mirror processing module is configured to further add the information indicating the attack path to the mirror packet.

5. The packet relay apparatus according to claim 1, wherein the mirror processing module is configured to add a VLAN-tag to the mirror packet, and to set information on the one of the attack and the attack sign in one of a VLAN ID and a user priority of the VLAN-tag to be added.

6. The packet relay apparatus according to claim 1, wherein the security judgment module is configured to judge that the packet is one of the attack and the attack sign based on packet information set in advance.

7. The packet relay apparatus according to claim 1, wherein the security judgment module is configured to judge that the packet is one of the attack and the attack sign based on a search result in a search table set in advance.

8. The packet relay apparatus according to claim 1, wherein the security judgment module is configured to judge the packet is one of the attack and the attack sign based on a feature pattern in packet information on a plurality of packets.

9. The packet relay apparatus according to claim 1, wherein the security judgment module is configured to judge the packet is one of the attack and the attack sign based on a feature amount.

10. The packet relay apparatus according to claim 9, wherein the feature amount comprises a packet byte length.

11. The packet relay apparatus according to claim 9, wherein the feature amount comprises a packet bandwidth.

12. The packet relay apparatus according to claim 9, wherein the feature amount comprises a packet statistic.

13. The packet relay apparatus according to claim 9, wherein the security judgment module is configured to judge the packet is one of the attack and the attack sign based on a temporal fluctuation of the feature amount.

14. The packet relay apparatus according to claim 1,
wherein the packet relay apparatus comprises a plurality of mirror ports including the mirror port, and
wherein the mirror processing module is configured to transmit, from the plurality of mirror ports that are different from each other, a plurality of mirror packets copied from the packet.

15. The packet relay apparatus according to claim 1,
wherein the transmitting module is configured to select, for each attack type, one of the plurality of mirror ports for transmitting the mirror packet based on one of a hash algorithm and a round-robin algorithm.

16. The packet relay apparatus according to claim 1, wherein the mirror policing module is configured to limit the monitored bandwidth of the determined mirror port to not exceed a predetermined bandwidth limit set for the determined mirror port.

17. The packet relay apparatus according to claim 16, wherein the mirror shaping module is configured to shape the transmission of the mirror packet at a predetermined output bandwidth set for the determined priority at the determined mirror port.

18. The packet relay apparatus according to claim 17, wherein the mirror sampling module is configured to transmit the mirror packet from the mirror port at the sampling rate set for the one of the attack type information, the attack impact degree information, the attack probability information, and the attack path information.

* * * * *